United States Patent
Kanai et al.

(10) Patent No.: US 7,356,666 B2
(45) Date of Patent: Apr. 8, 2008

(54) LOCAL MEMORY MANAGEMENT SYSTEM WITH PLURAL PROCESSORS

(75) Inventors: Tatsunori Kanai, Yokohama (JP); Seiji Maeda, Inagi (JP); Kenichiro Yoshii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 10/808,320

(22) Filed: Mar. 25, 2004

(65) Prior Publication Data
US 2004/0268083 A1    Dec. 30, 2004

(30) Foreign Application Priority Data
Jun. 27, 2003    (JP) ............... 2003-185416

(51) Int. Cl.
*G06F 12/00*    (2006.01)
(52) U.S. Cl. .................. 711/202; 711/147; 709/212; 709/216
(58) Field of Classification Search ............... 709/212, 709/216, 245; 711/148, 202, 147
See application file for complete search history.

(56) References Cited

U.S. PATENT DOCUMENTS

| | | | | |
|---|---|---|---|---|
| 6,336,177 | B1 * | 1/2002 | Stevens ............... | 711/170 |
| 6,622,155 | B1 * | 9/2003 | Haddon et al. ............... | 715/100 |
| 2006/0143350 | A1 * | 6/2006 | Miloushev et al. ............... | 710/242 |

FOREIGN PATENT DOCUMENTS

| | | |
|---|---|---|
| JP | 2-242434 | 9/1990 |
| JP | 4-245745 | 9/1992 |
| JP | 8-180025 | 7/1996 |
| JP | 10-143380 | 5/1998 |
| WO | WO 84/01043 | 3/1984 |
| WO | WO 00/36509 | 6/2000 |

OTHER PUBLICATIONS

U.S. Appl. No. 10/715,546, filed Nov. 19, 2003, Yoshi et al.
U.S. Appl. No. 10/808,320, filed Mar. 25, 2004, Kanai et al.
U.S. Appl. No. 10/808,470, filed Mar. 25, 2004, Kanai et al.

(Continued)

*Primary Examiner*—Woo H. Choi
(74) *Attorney, Agent, or Firm*—Oblon, Spivak, McClelland, Maier & Neustadt, P.C.

(57) ABSTRACT

An information processing system includes a first processor having a first local memory, a second processor having a second local memory, and a third processor having a third local memory. The system further includes a unit which maps one of the second and third local memories in part of an effective address space of a first thread to be executed by the first processor. The mapped one of the second and third local memories is the local memory of a corresponding one of the second and third processors, which executes a second thread interacting with the first thread. The system also includes a unit that changes a local memory to be mapped in part of the effective address space of the first thread from the one of the second and third local memories to the other.

12 Claims, 28 Drawing Sheets

OTHER PUBLICATIONS

U.S. Appl. No. 10/808,280, filed Mar. 25, 2004, Kanai et al.
U.S. Appl. No. 10/895,040, filed Jul. 21, 2004, Kanai et al.
U.S. Appl. No. 10/902,938, filed Aug. 02, 2004, Kanai et al.
U.S. Appl. No. 10/935,188, filed Sep. 08, 2004, Kanai et al.
U.S. Appl. No. 11/232,984, filed Sep. 23, 2005, Maeda et al.
U.S. Appl. No. 11/233,026, filed Sep. 23, 2005, Maeda et al.
US 6,021,479, 02/2000, Stevens (withdrawn)

* cited by examiner

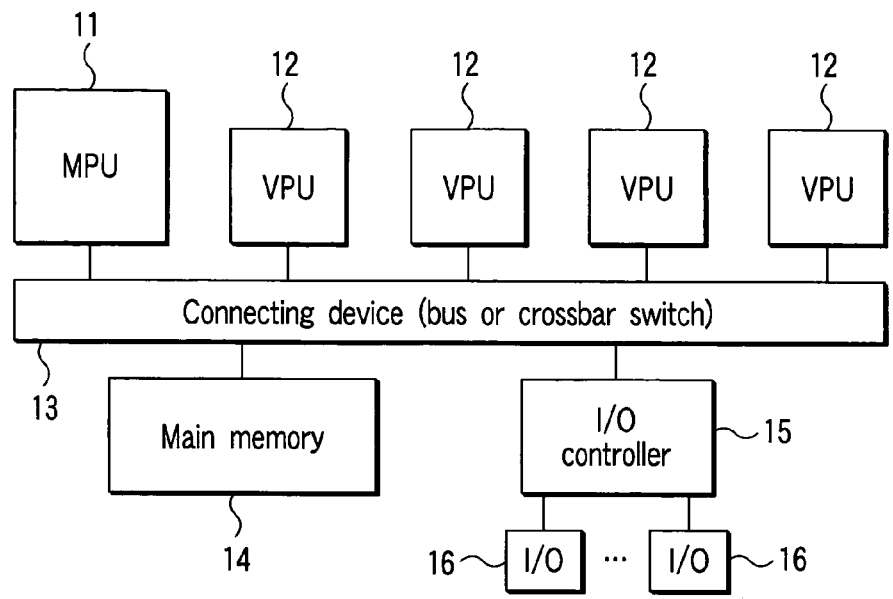
F I G. 1
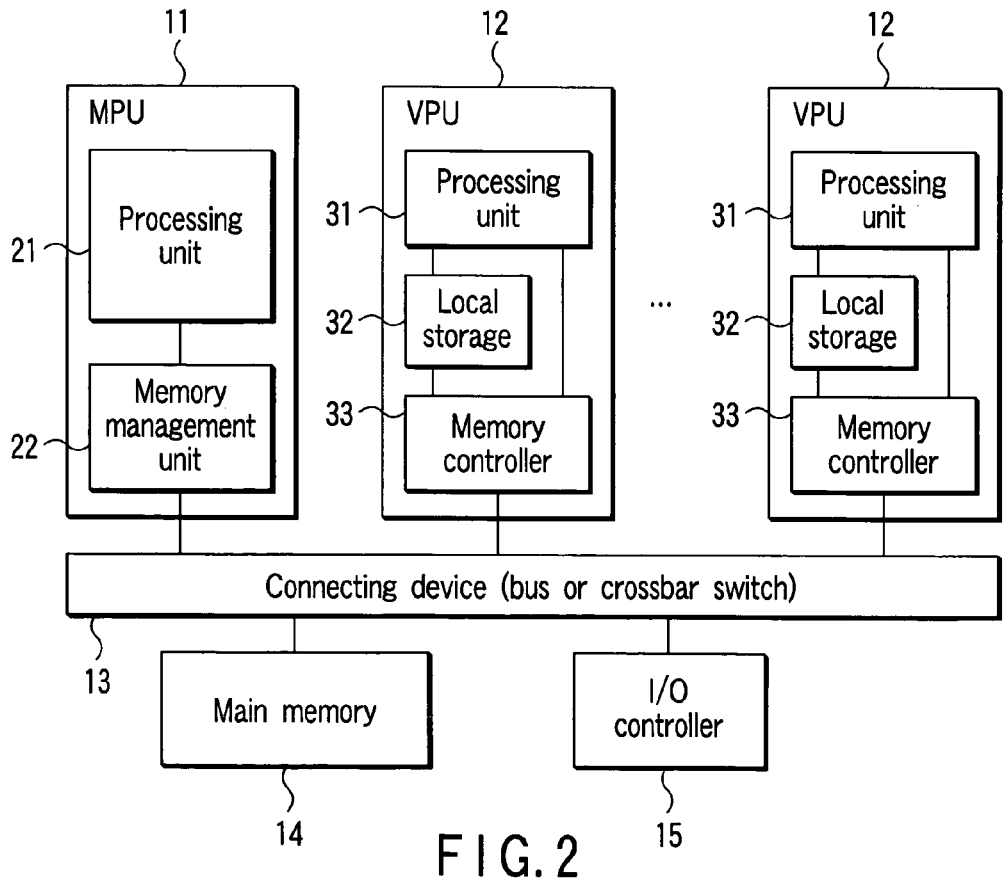
F I G. 2

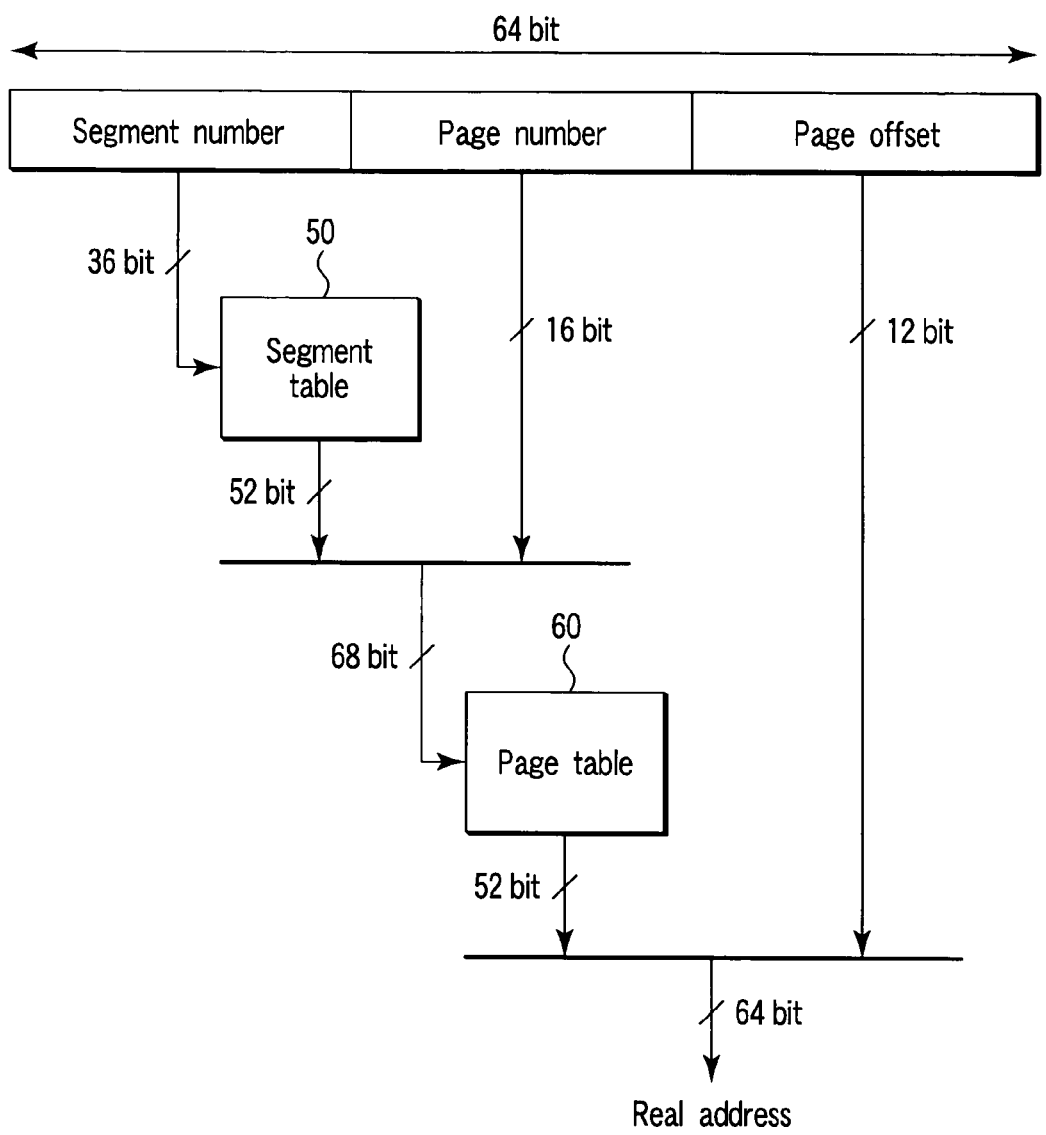
F I G. 3

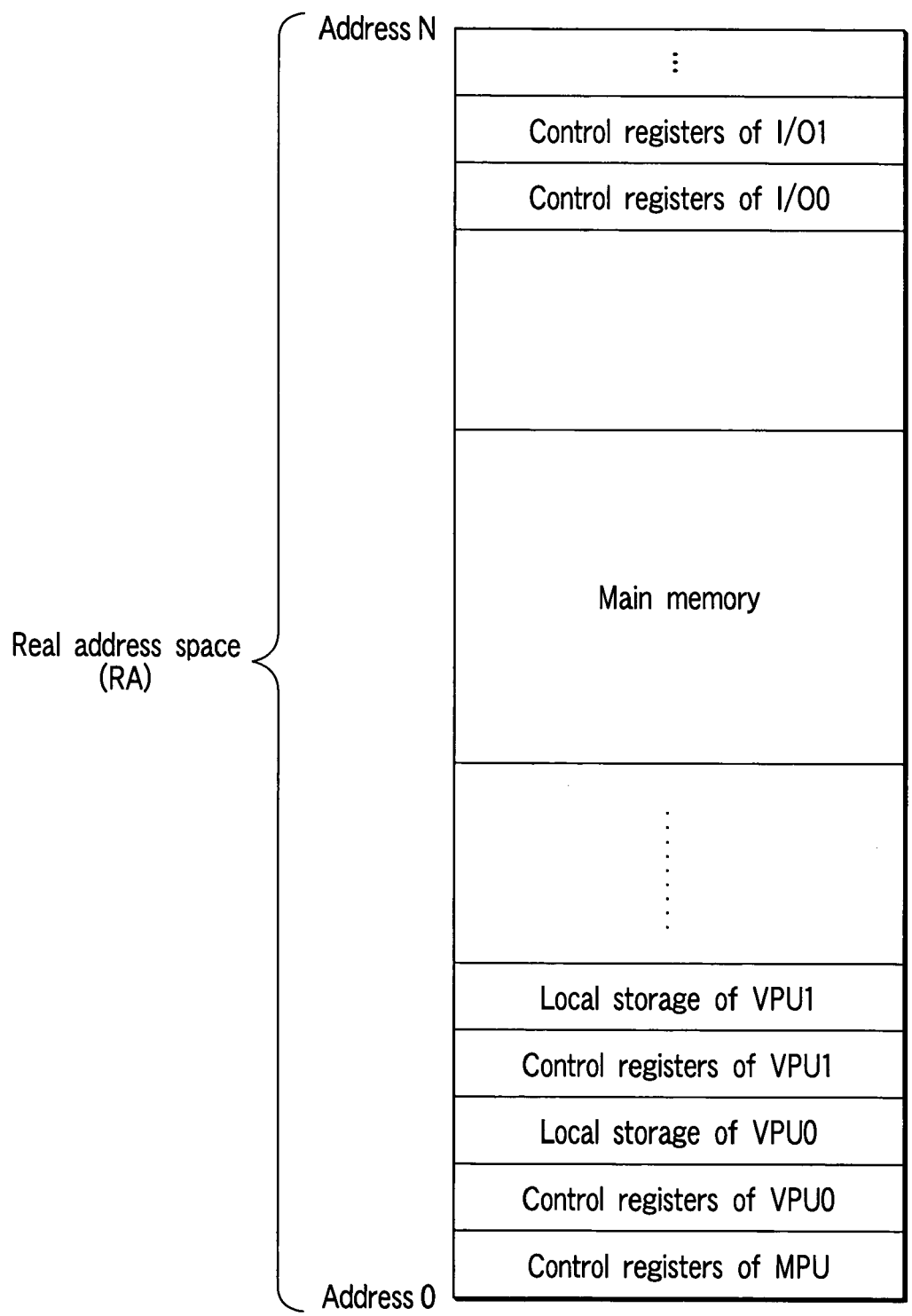
F I G. 4

Structural description 117

| Number | Program | Input | Output | Cost | Buffer |
|---|---|---|---|---|---|
| (1) | DEMUX | Received signal | (2) (3) (4) | 5 | 100KB 1MB 10KB |
| (2) | A-DEC | (1) | Audio output | 10 | — |
| (3) | V-DEC | (1) | (5) | 50 | 1MB |
| (4) | TEXT | (1) | (6) | 5 | 10KB |
| (5) | PROG | (3) | (6) | 20 | 1MB |
| (6) | BLEND | (4) (5) | Video output | 10 | — |

Thread parameters
- Tightly coupled thread group :
- Loosely coupled thread group :

Others

FIG. 8

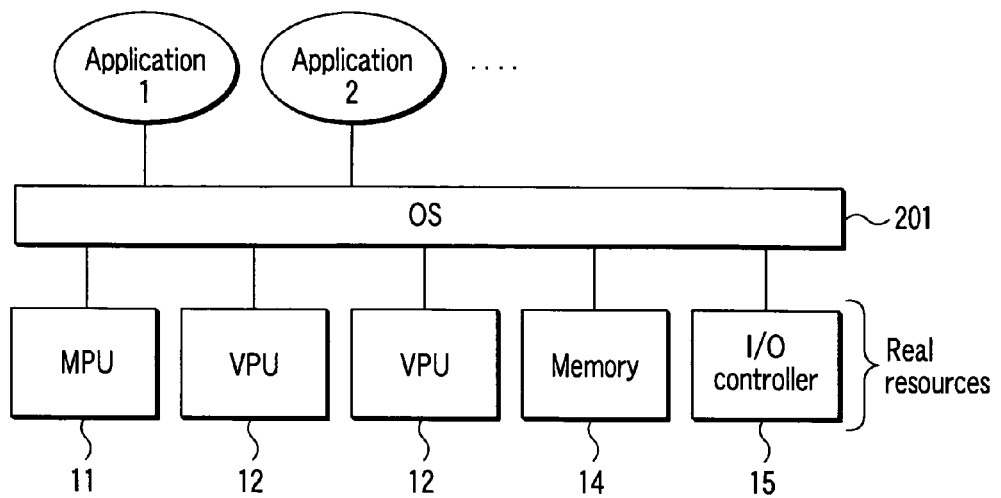
F I G. 12
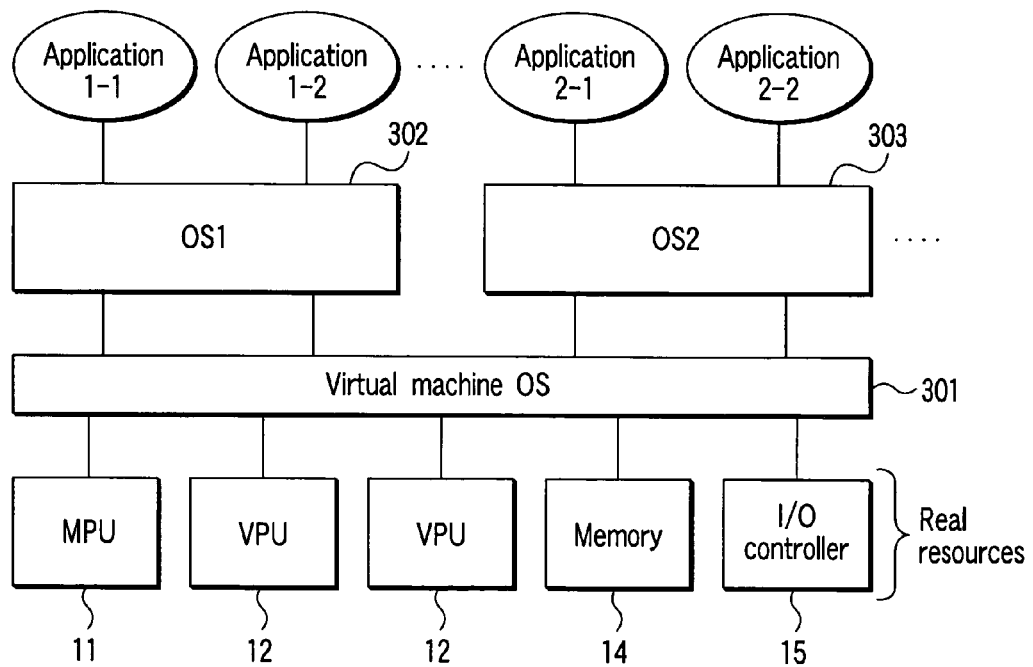
F I G. 13

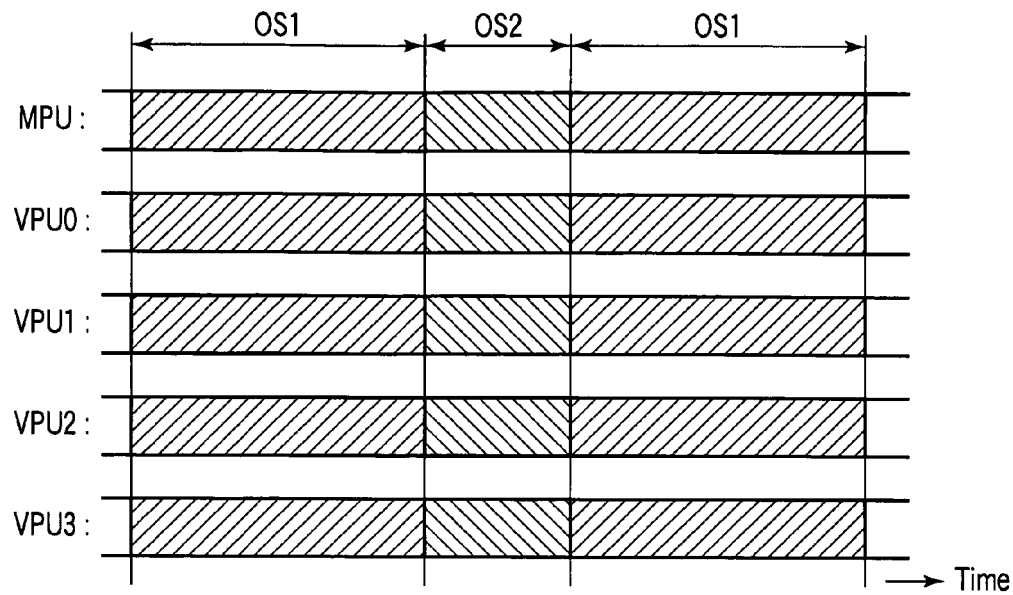
F I G. 15
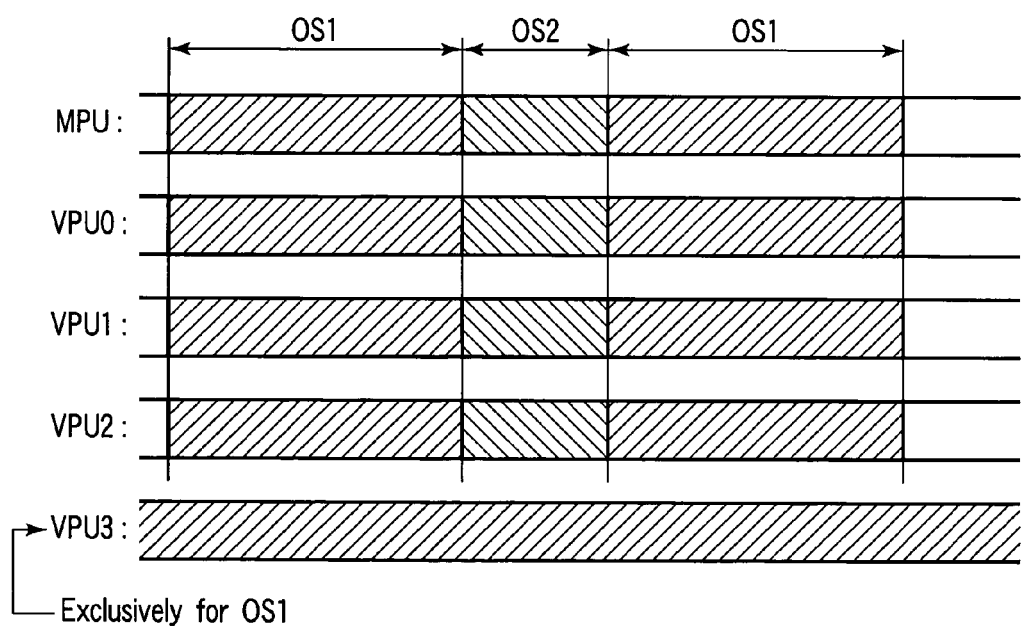
F I G. 16

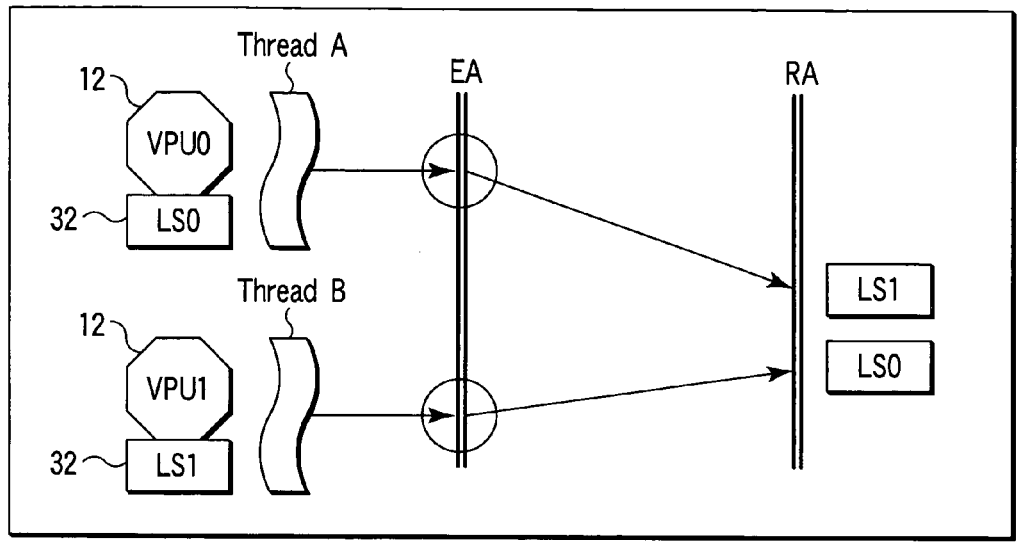
F I G. 27
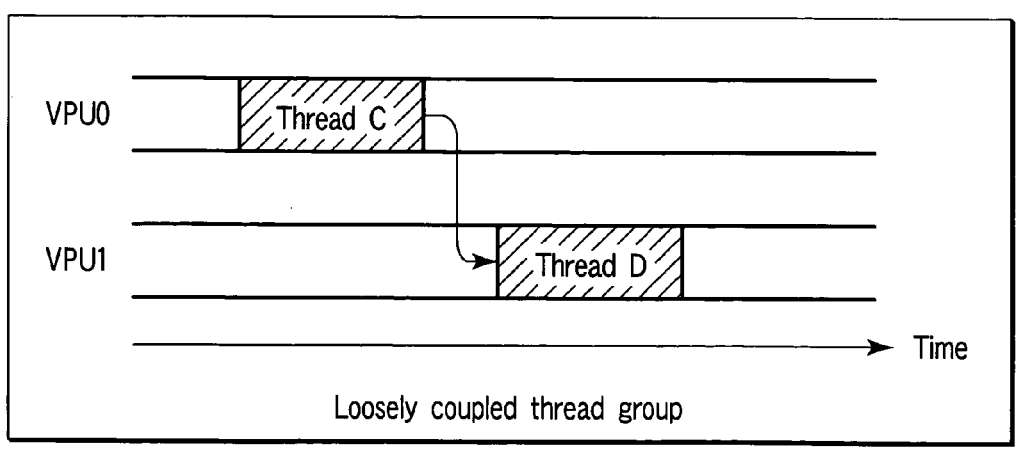
F I G. 28

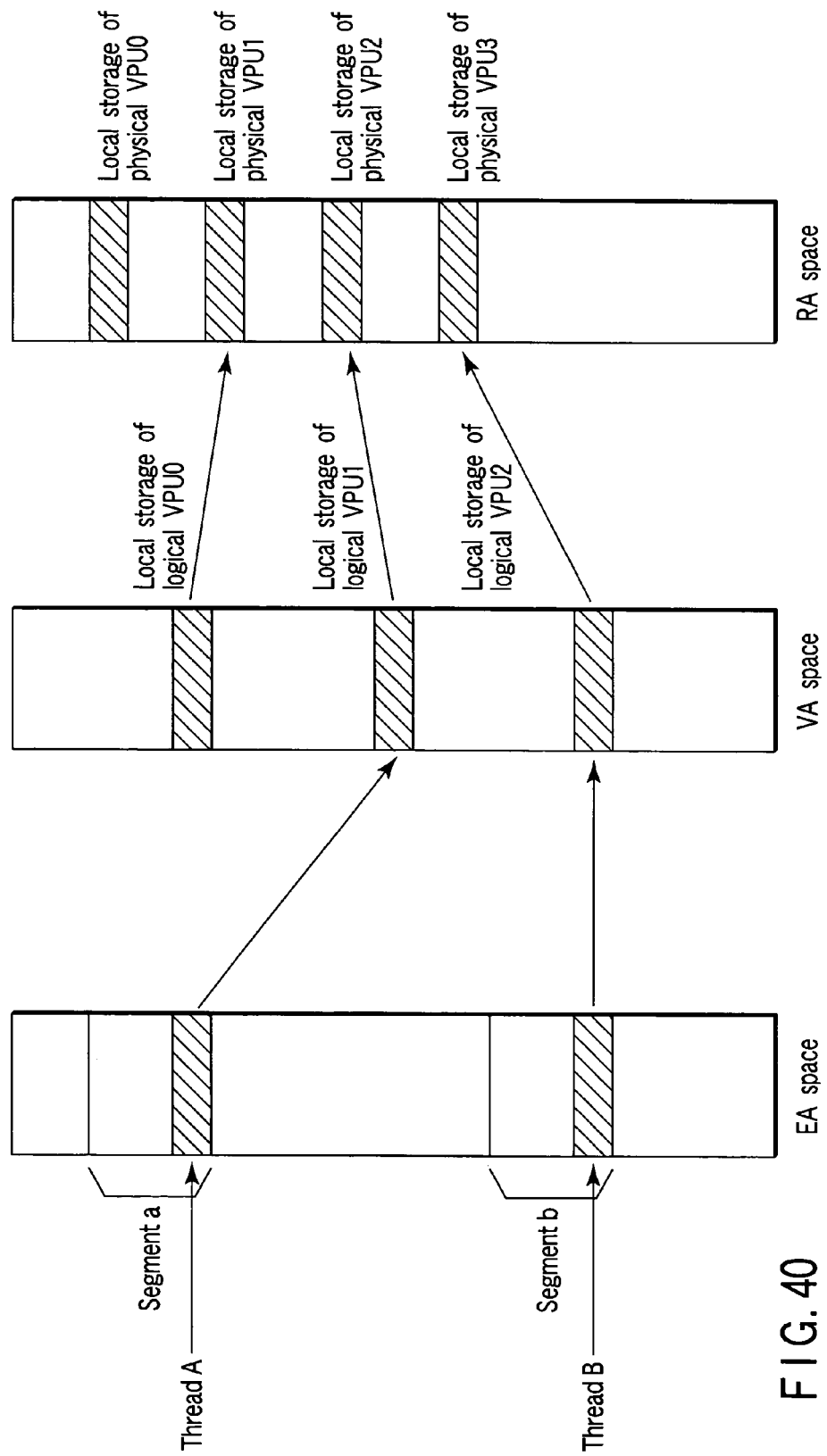
F I G. 40

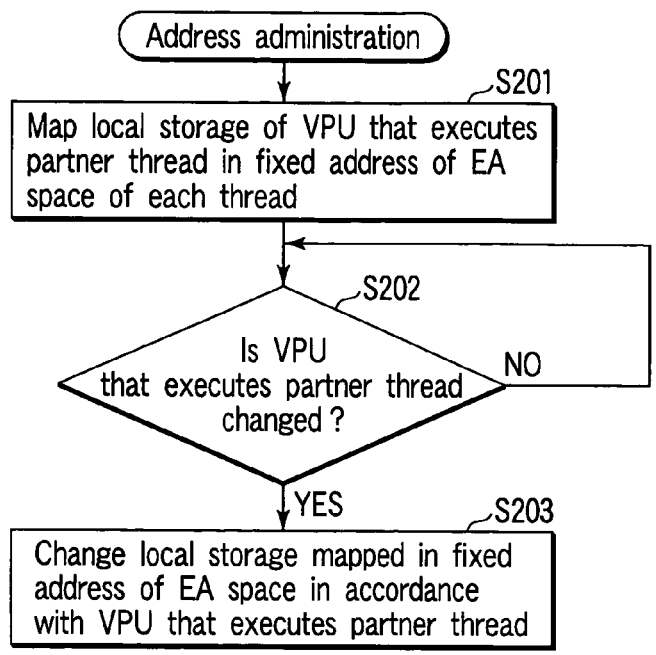
F I G. 43
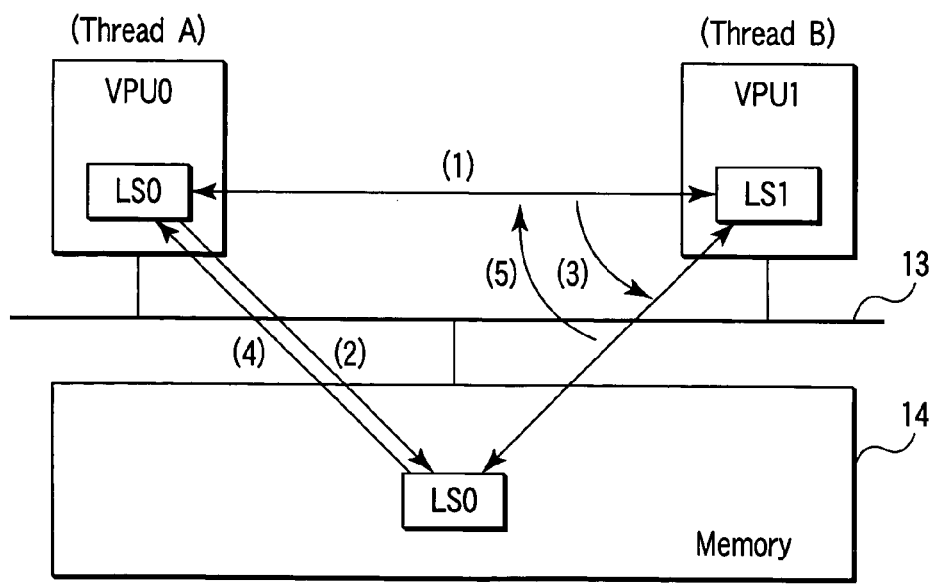
F I G. 44

LOCAL MEMORY MANAGEMENT SYSTEM WITH PLURAL PROCESSORS

CROSS-REFERENCE TO RELATED APPLICATIONS

This application is based upon and claims the benefit of priority from prior Japanese Patent Application No. 2003-185416, filed Jun. 27, 2003, the entire contents of which are incorporated herein by reference.

BACKGROUND OF THE INVENTION

1. Field of the Invention

The present invention relates to an information processing system including a plurality of processors and a memory managing method used in the information processing system 2. Description of the Related Art Conventionally, computer systems such as server computers have utilized system architecture such as a multiprocessor and a parallel processor in order to improve in throughput. Both of the multiprocessor and parallel processor achieve a parallel computing operation using a plurality of processing units.

Jpn. Pat. Appln. KOKAI Publication No. 10-143380 discloses a computer system having a plurality of processing units. This computer system includes a single high-speed CPU, a plurality of low-speed CPUs and a shared memory. Processes are assigned to the high-speed and low-speed CPUs in consideration of parallelism and execution time of each process.

Not only the computer system but also an embedded device, which needs to process a large amount of data such as AV (audio video) data in real time, has recently required that system architecture such as a multiprocessor and a parallel processor be introduced to improve in throughput.

Under the present circumstances, however, a real-time processing system that is predicated on the above system architecture including a plurality of processors is hardly reported.

In a real-time processing system, each operation needs performing under given timing constraint. If, however, system architecture such as a multiprocessor and a parallel processor is applied to the real-time processing system, there occurs a problem that the performance of each of the processors cannot be used sufficiently because of the conflict of access with a shared memory, the constraints of the bandwidth of a memory bus and the like. Moreover, communications for transferring data between threads executed by different processors are carried out through a buffer on the shared memory. Therefore, latency associated with the communications between the threads that are frequently interacting with each other becomes a serious problem.

BRIEF SUMMARY OF THE INVENTION

An object of the present invention is to provide an information processing system and a memory managing method capable of efficiently executing a plurality of threads in parallel to each other using a plurality of processors.

According to an embodiment of the present invention, there is provided an information processing system comprising a first processor having a first local memory, a second processor having a second local memory, a third processor having a third local memory, means for mapping one of the second local memory and the third local memory in part of an effective address space of a first thread to be executed by the first processor, the one of the second local memory and the third local memory being the local memory of a corresponding one of the second processor and the third processor, which executes a second thread interacting with the first thread, and means for changing a local memory to be mapped in part of the effective address space of the first thread from the one of the second local memory and the third local memory to the other of the second local memory and the third local memory when a processor that executes the second thread is changed from the one of the second processor and the third processor to the other of the second processor and the third processor.

BRIEF DESCRIPTION OF THE SEVERAL VIEWS OF THE DRAWING

FIG. 1 is a block diagram showing an example of a computer system that configures a real-time processing system according to an embodiment of the present invention.

FIG. 2 is a block diagram of an MPU (master processing unit) and VPUs (versatile processing units) provided in the real-time processing system according to the embodiment of the present invention.

FIG. 3 is a diagram showing an example of a virtual address translation mechanism used in the real-time processing system according to the embodiment of the present invention.

FIG. 4 is a diagram showing an example of data mapped in real address space in the real-time processing system according to the embodiment of the present invention.

FIG. 8 is a table showing an example of a structural description included in the program module shown in FIG. 7.

FIG. 12 is a diagram showing an example of an operating system in the real-time processing system according to the embodiment of the present invention.

FIG. 13 is a diagram showing another example of the operating system in the real-time processing system according to the embodiment of the present invention.

FIG. 15 is a chart showing resources that are time-divisionally assigned to a plurality of guest OSes in the real-time processing system according to the embodiment of the present invention.

FIG. 16 is a chart showing resources that are occupied by a specific guest OS in the real-time processing system according to the embodiment of the present invention.

FIG. 27 is an illustration of mapping of local storages of VPUs executing partner threads in effective address spaces of the tightly coupled threads in the real-time processing system according to the embodiment of the present invention.

FIG. 28 is an illustration of allocation of processors to threads belonging to a loosely coupled thread group in the real-time processing system according to the embodiment of the present invention.

FIG. 40 is a third diagram describing a change in mapping of local storages in the real-time processing system according to the embodiment of the present invention.

FIG. 43 is a flowchart showing a procedure for address administration performed to change the mapping of local storages in the real-time processing system according to the embodiment of the present invention.

FIG. 44 is an illustration of a change in mapping between a memory and local storages in the real-time processing system according to the embodiment of the present invention.

DETAILED DESCRIPTION OF THE INVENTION

Figure 5:
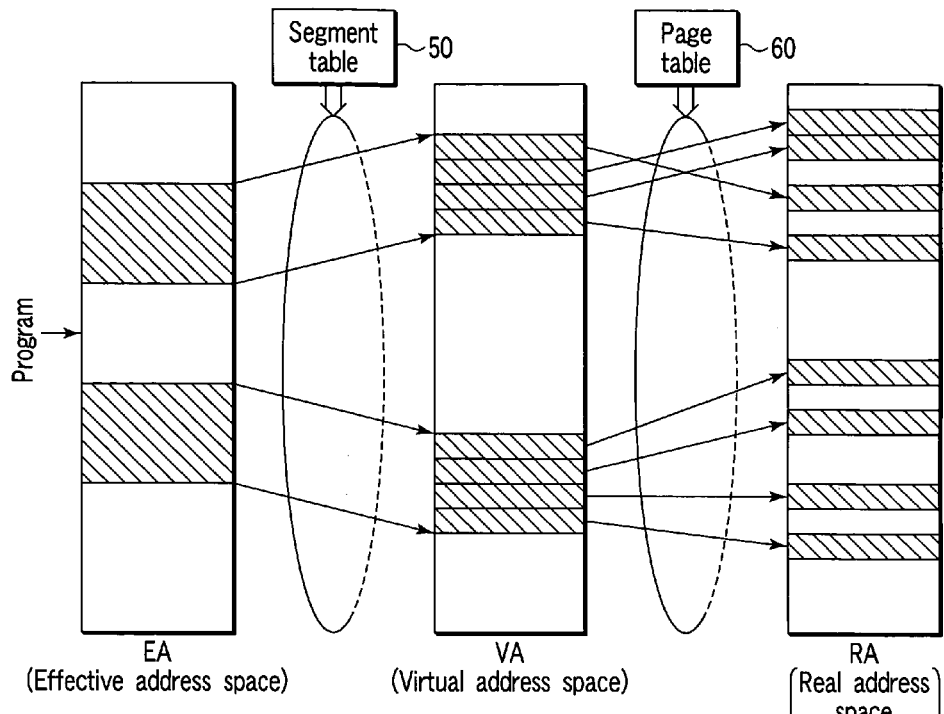
FIG. 5 is an illustration of effective address space, virtual address space and real address space in the real-time processing system according to the embodiment of the present invention.

An embodiment of the present invention will now be described with reference to the accompanying drawings.

FIG. 1 shows an example of a configuration of a computer system for achieving a real-time processing system according to an embodiment of the present invention. The computer system is an information processing system that performs various operations, which need to be done in real time, under timing constraint. The computer system can be used as not only a general-purpose computer but also an embedded system for various electronic devices to perform operations that need to be done in real time. Referring to FIG. 1, the computer system comprises an MPU (master processing unit) 11, a plurality of VPUs (versatile processing units) 12, a connecting device 13, a main memory 14 and an I/O (input/output) controller 15. The MPU 11, VPUs 12, main memory 14 and IO controller 15 are connected to each other by the connecting device 13. The connecting device 13 is formed of a bus or an inter-connection network such as a crossbar switch. If a bus is used for the connecting device 13, it also can be shaped like a ring. The MPU 11 is a main processor that controls an operation of the computer system. The MPU 11 mainly executes an OS (operating system). Some functions of the OS can be executed by the VPUs 12 and IO controller 15. Each of the VPUs 12 is a processor for performing various operations under the control of the MPU 11. The MPU 11 distributes the operations (tasks) to be performed to the VPUs 12 in order to perform these operations (tasks) in parallel. The operations can thus be performed at high speed and with high efficiency. The main memory 14 is a main storage device (shared memory) that is shared by the MPU 11, VPUs 12 and I/O controller 15. The main memory 14 stores the OS and application programs. The I/O controller 15 is connected to one or more I/O devices 16. The controller 15 is also referred to as a bridge device.

The connecting device 13 has a QoS (quality of service) function that guarantees a data transfer rate. The QoS function is fulfilled by transferring data through the connecting device 13 at a reserved bandwidth (transfer rate). The QoS function is used when write data needs transmitting to the memory 14 from one VPU 12 at e.g., 5 Mbps or when data needs transferring between one VPU 12 and another VPU 12 at e.g., 100 Mbps. Each of the VPUs 12 designates (reserves) a bandwidth (transfer rate) for the connecting device 13. The connecting device 13 assigns the designated bandwidth to the VPU 12 by priority. If a bandwidth is reserved for data transfer of a VPU 12, it is secured even though another VPU 12, MPU 11 or IO controller 15 transfers a large amount of data during the data transfer of the former VPU 12. The QoS function is particularly important to computers that perform real-time operations.

The computer system shown in FIG. 1 comprises one MPU 11, four VPUs 12, one memory 14 and one IO controller 15. The number of VPUs 12 is not limited. The system can be configured without MPU and, in this case, one VPU 12 performs the operation of the MPU 11. In other words, one VPU 12 serves as a virtual MPU 11.

FIG. 2 shows an MPU 11 and VPUs 12. The MPU 11 includes a processing unit 21 and a memory management unit 22. The processing unit 21 accesses the memory 14 through the memory management unit 22. The memory management unit 22 performs a virtual memory management function and also manages a cache memory in the memory management unit 22. Each of the VPUs 12 includes a processing unit 31, a local storage (local memory) 32 and a memory controller 33. The processing unit 31 of each VPU 12 can gain direct access to the local storage 32 in the same VPU 12. The memory controller 33 serves as a DMA (direct memory access) controller that transfers data between the local storage 32 and memory 14. The memory controller 33 is so configured to utilize the QoS function of the connecting device 13 and has a function of designating a bandwidth and that of inputting/outputting data at the designated bandwidth. The memory controller 33 also has the same virtual memory management function as that of the memory management unit 22 of the MPU 11. The processing unit 31 uses the local storage 32 as a main memory. The processing unit 31 does not gain direct access to the memory 14 but instructs the memory controller 33 to transfer the contents of the memory-14 to the local storage 32. The processing unit 31 accesses the local storage 32 to read/write data. Moreover, the processing unit 31 instructs the memory controller 33 to write the contents of the local storage 32 to the memory 14.

The memory management unit 22 of the MPU 11 and the memory controllers 33 of the VPUs 12 perform virtual memory management as shown in FIG. 3. The address viewed from the processing unit 21 of the MPU 11 or the memory controllers 33 of the VPUs 12 is a 64-bit address as indicated in the upper part of FIG. 3. In the 64-bit address, an upper 36-bit portion indicates a segment number, a middle 16-bit portion indicates a page number, and a lower 12-bit portion indicates a page offset. The memory management unit 22 and memory controllers 33 each include a segment table 50 and a page table 60. The segment table 50 and page table 60 convert the 64-bit address into the real address space that is actually accessed through the connecting device 13.

For example, the following data items are mapped in the real address (RA) space viewed from the MPU 11 and each VPU 12, as shown in FIG. 4.
1. Memory 14 (main storage device)
2. Control registers of MPU 11
3. Control registers of VPUs 12
4. Local storages of VPUs 12
5. Control registers of I/O devices (including control registers of I/O controller 15)

The MPU 11 and VPUs 12 can access any address in the real address space by the virtual memory management function in order to read/write data items 1 to 5 described above. It is particularly important to be able to access the real address space and thus access the local storage 32 of any VPU 12 from the MPU 11 and VPUs 12 and even from the I/O controller 15. Furthermore, the segment table 50 or page table 60 can prevent the contents of the local storage 32 of each VPU 12 from being read or written freely.

FIG. 5 shows memory address spaces managed by the virtual memory management function shown in FIG. 3. It is the EA (effective address) space that is viewed directly from the programs executed on the MPU 11 or VPUs 12. An effective address is mapped in the VA (virtual address) space by the segment table 50. A virtual address is mapped in the RA (real address) space by the page table 60. The RA space has a structure as shown in FIG. 4.

The MPU 11 can manage the VPUs 12 using a hardware mechanism such as a control register. For example, the MPU 11 can read/write data from/to the register of each VPU 12 and start/stop each VPU 12 to execute programs. Communication and synchronization between the MPU 11 and each of the VPUs 12 can be performed by means of a hardware mechanism such as a mailbox and an event flag, as can be communication and synchronization between the VPUs 12.

The computer system according to the present embodiment allows an operation of an electric device, which makes a stringent demand on real-time operations as conventionally implemented by hardware, to be carried out by software. For example, one VPU 12 performs a computation corresponding to some hardware components that compose the electric device and concurrently another VPU 12 performs a computation corresponding to other hardware components that compose the electric device.

Figure 6:
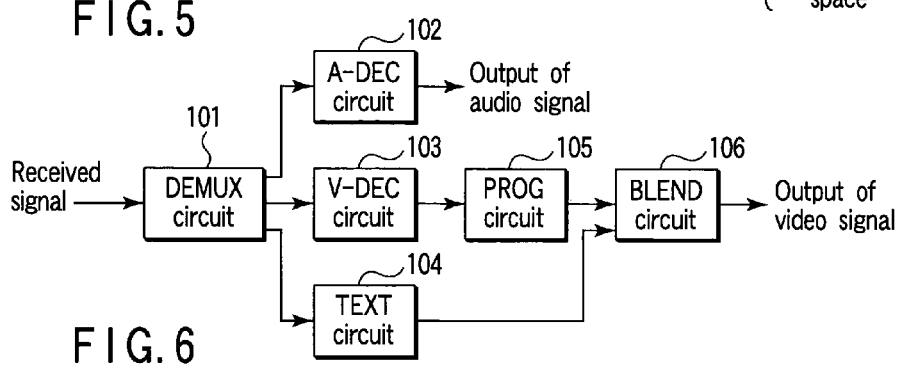
FIG. 6 is a block diagram of a receiver for digital TV broadcast.

FIG. 6 simply shows a hardware structure of a receiver for digital TV broadcast. In this receiver, a DEMUX (demultiplexer) circuit 101 divides a received broadcast signal into compressing-encoded data streams corresponding to audio data, video data and subtitle data. An A-DEC (audio decoder) circuit 102 decodes the compressing-encoded audio data stream. A V-DEC (video decoder) circuit 103 decodes the compressing-encoded video data stream. The decoded video data stream is sent to a PROG (progressive conversion) circuit 105 and converted into a progressive video signal. The progressive video signal is sent to a BLEND (image blending) circuit 106. A TEXT (subtitle data processing) circuit 104 converts the compressing-encoded subtitle data stream into a subtitle video signal and sends it to the BLEND circuit 106. The BLEND circuit 106 blends the video signal sent from the PROG circuit 105 and the subtitle video signal sent from the TEXT circuit 104 and outputs the blended signal as a video stream. A series of operations as described above is repeated at a video frame rate (e.g., 30, 32 or 60 frames per second).

Figure 7:
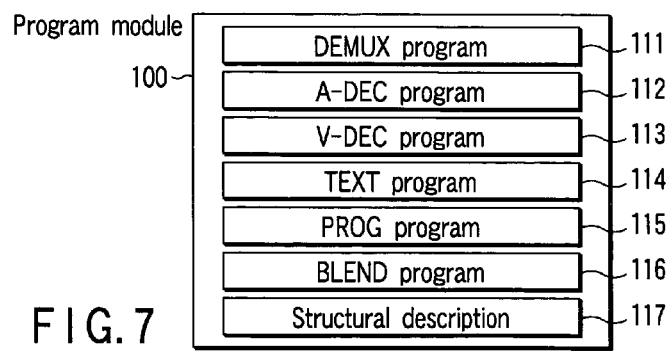
FIG. 7 is a diagram showing an example of a program module executed by the real-time processing system according to the embodiment of the present invention.

In order to perform operations of the hardware shown in FIG. 6 by software, the present embodiment provides a program module 100 as shown in FIG. 7. The program module 100 is an application program for causing the computer system to perform the operations of the DEMUX circuit 101, A-DEC circuit 102, V-DEC circuit 103, TEXT circuit 104, PROG circuit 105 and BLEND circuit 106 shown in FIG. 6. The application program is described by multi-thread programming, and is structured as a group of threads for executing a real-time operation. The real-time operation includes a combination of a plurality of tasks. The program module 100 contains a plurality of programs (a plurality of routines) each executed as a thread. Specifically, the program module 100 contains a DEMUX program 111, an A-DEC program 112, a V-DEC program 113, a TEXT program 114, a PROG program 115 and a BLEND program 116. These programs 111 to 116 are programs describing procedures of tasks corresponding to operations (DMUX operation, A-DEC operation, V-DEC operation, TEXT operation, PROG operation, BLEND operation) of the circuits 101 to 106. More specifically, when the program module 100 runs, a thread corresponding to each of the programs 111 to 116 is generated, and dispatched to one or more VPUs 12 and executed thereon. A program corresponding to the thread dispatched to the VPU 12 is loaded to the local storage 32 of the VPU 12, and the thread executes the program on the local storage 32. The program module 100 is obtained by packaging the programs 111 to 116, which correspond to hardware modules for configuring a receiver for digital TV broadcast, with data called a structural description 117.

The structural description 117 is information indicative of how the programs (threads) in the program module 100 are combined and executed. The structural description 117 includes information indicative of a relationship in input/output between the programs 111 to 116 and costs (time) necessary for executing each of the programs 111 to 116. FIG. 8 shows an example of the structural description 117.

Figure 9:
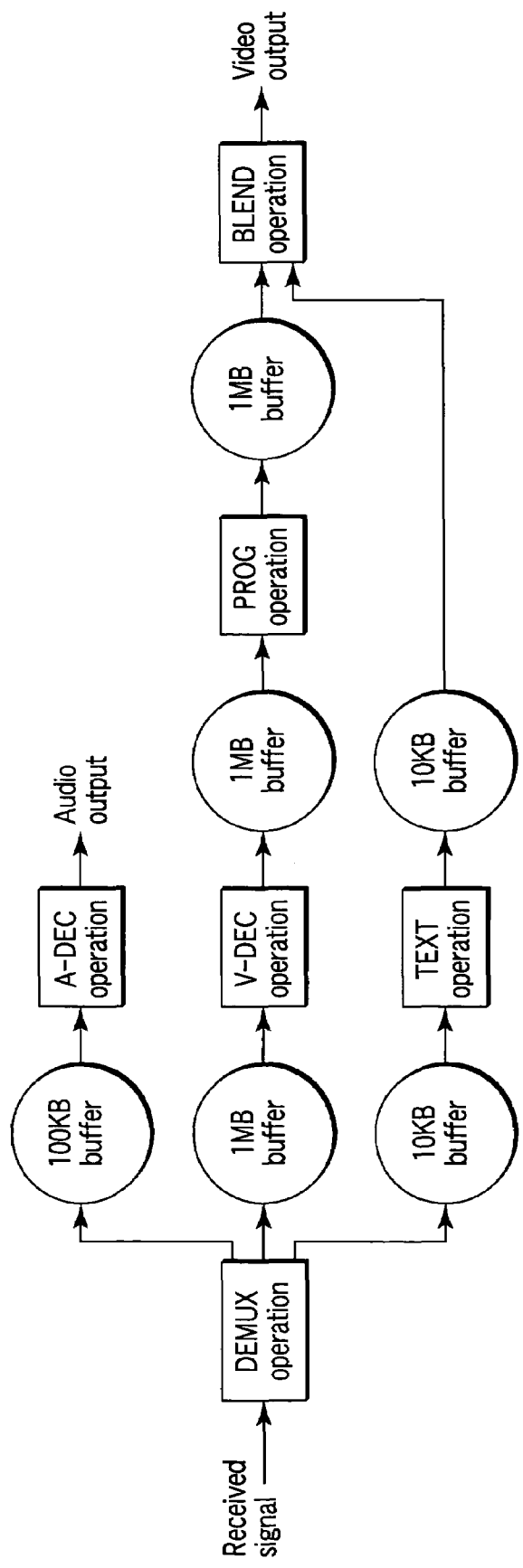
FIG. 9 is a chart showing a flow of data among programs corresponding to the program module shown in FIG. 7.

The structural description 117 shows modules (programs in the program module 100) each executed as a thread and their corresponding inputs, outputs, execution costs, and buffer sizes necessary for the outputs. For example, the V-DEC program of No. (3) receives the output of the DEMUX program of No. (1) as an input and transmits its output to the PROG program of No. (5). The buffer necessary for the output of the V-DEC program is 1 MB and the cost for executing the V-DEC program in itself is 50. The cost can be described in units of time (time period) necessary for executing the program, or step number of the program. It also can be described in units of time required for executing the program by a virtual processor having some virtual specifications. Since the VPU specifications and performance may vary from computer to computer, it is desirable to describe the cost in such virtual units. If the programs are executed according to the structural description 117 shown in FIG. 8, data flows among the programs as illustrated in FIG. 9.

The structural description 117 also shows coupling attribute information, which indicates a coupling attribute between threads corresponding to the programs 111 to 116, as thread parameters. The coupling attribute includes two different attributes of a tightly coupled attribute and a loosely coupled attribute. A plurality of threads having tightly coupled attribute are executed in cooperation with each other and referred to as a tightly coupled thread group. The computer system of the present embodiment schedules the threads belonging to each tightly coupled thread group such that the threads belonging to the same tightly coupled thread group can simultaneously be executed by different VPUs. A plurality of threads having the loosely coupled attribute is referred to as a loosely coupled thread group. A programmer can designate a coupling attribute between threads corresponding to the programs 11 to 16 using thread parameters. The tightly and loosely coupled thread groups will be described in detail with reference to FIG. 25 et seq. The thread parameters including the coupling attribute information can be described directly as codes in the programs 111 to 116, not as the structural description 117.

Figure 10:
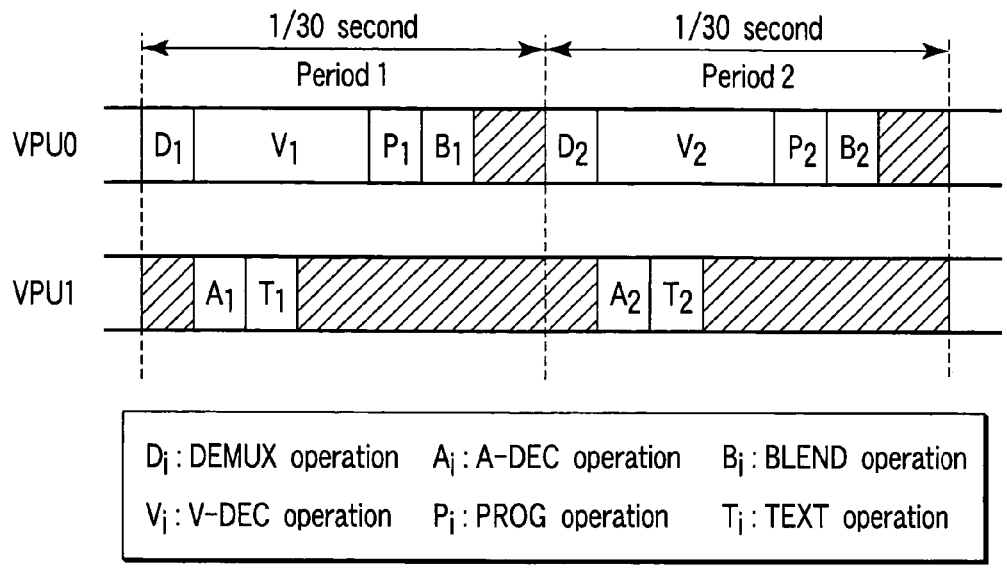
FIG. 10 is a chart showing a parallel operation of the program module shown in FIG. 7, which is performed by two VPUs.
Figure 11:
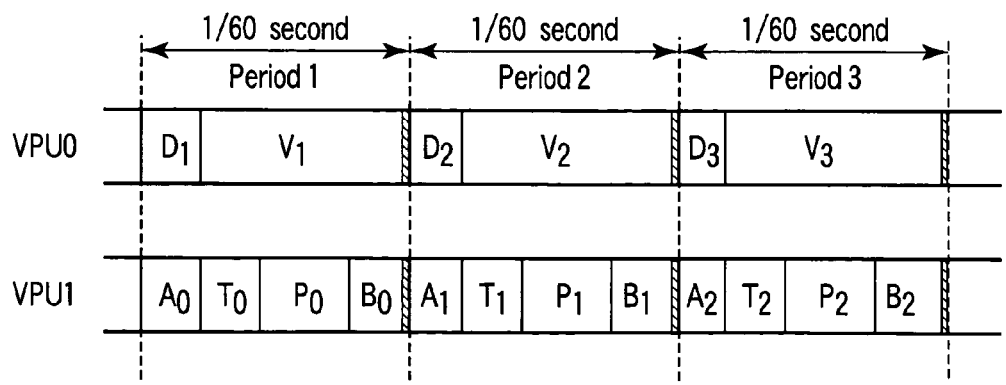
FIG. 11 is a chart showing a pipeline operation of the program module shown in FIG. 7, which is performed by two VPUs.

Referring to FIGS. 10 and 11, there now follows descriptions as to how the computer system of the present embodiment executes the programs 111 to 116. Assume here that the computer system includes two VPUs of VPU0 and VPU1. FIG. 10 shows time for assigning the programs to each of the VPUs when video data of 30 frames is displayed per second. Audio and video data for one frame is output in one period (1/30 second). First, the VPU0 executes the DEMUX program to perform the DEMUX operation and writes its resultant audio, video and subtitle data to the buffers. After that, the VPU1 executes the A-DEC program and TEXT program to perform the A-DEC operation and the TEXT operation in sequence and writes their results to the buffers. Then, the VPU0 executes the V-DEC program to perform the V-DEC operation and writes its result to the buffer. The VPU0 executes the PROG program to perform the PROG operation and writes its result to the buffer. Since the VPU1 has already completed the TEXT program at this time, the VPU0 executes the last BLEND program to perform the BLEND operation, in order to create final video data. The above processing is repeated for every period.

An operation to determine which program is executed by each of the VPUs 2 and when it is done to perform a desired operation without delay is called scheduling. A module to carry out the scheduling is called a scheduler. In the present embodiment, the scheduling is carried out based on the above structural description 117 contained in the program module 100.

FIG. 11 shows the programs executed when video data of 60 frames is displayed per second. FIG. 11 differs from FIG. 10 as follows. In FIG. 11, data of 60 frames needs to be processed per second, whereas in FIG. 10, data of 30 frames is processed per second and thus data processing for one frame can be completed in one period (1/30 second). In other words, one-frame data processing cannot be completed in one period (1/60 second) and thus a software pipeline operation that spans a plurality of (two) periods is performed in FIG. 11. For example, in period 1, the VPU0 executes the DEMUX program and V-DEC program for the input signal. After that, in period 2, the VPU1 executes the A-DEC, TEXT, PROG and BLEND programs and outputs final video data. In period 2, the VPU0 executes the DEMUX and V-DEC programs in the next frame. The DEMUX and V-DEC programs of the VPU0 and the A-DEC, TEXT, PROG and BLEND programs of the VPU1 are executed over two periods as a pipeline operation.

The program module 100 shown in FIG. 7 can be recorded in advance in a flash ROM and a hard disk in a device incorporating the computer system of the present embodiment, or circulated through a network. In this case, the contents of operations to be performed by the computer system vary according to the type of a program module downloaded through the network. Thus, the device incorporating the computer system can perform the real-time operation corresponding to each of various pieces of dedicated hardware. If new player software, decoder software and encryption software necessary for reproducing new contents are distributed together with the contents as program modules executable by the computer system, any device incorporating the computer system can reproduce the contents within acceptable limits of ability.

Operating System

When only one OS (operating system) 201 is loaded into the computer system of the present embodiment, it manages all real resources (MPU 11, VPUs 12, memory 14, I/O controller 15, I/O device 16, etc.), as shown in FIG. 12.

Figure 14:
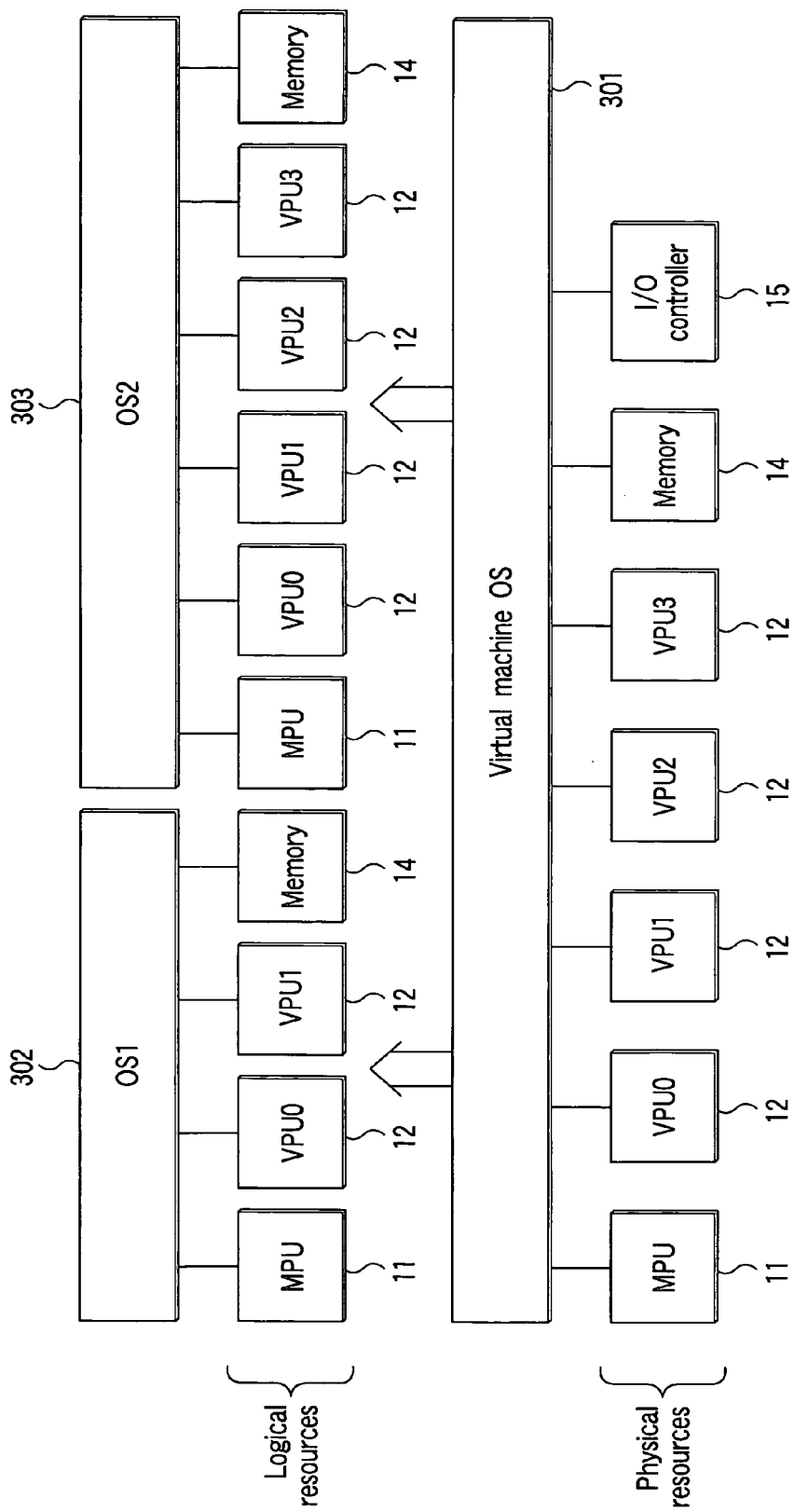
FIG. 14 is a diagram showing a relationship between a virtual machine OS and a guest OS in the real-time processing system according to the embodiment of the present invention.

On the other hand, a plurality of OSes can be performed at once using a virtual machine system. In this case, as shown in FIG. 13, a virtual machine OS 301 is loaded into the computer system to manage all real resources (MPU 11, VPUs 12, memory 14, I/O controller 15, I/O device 16, etc.). The virtual machine OS 301 is also referred to as a host OS. One or more OSes 302 and 303, which are also referred to as guest OSes, are loaded on the virtual machine OS 301. Referring to FIG. 14, the guest OSes 302 and 303 each run on a computer including virtual machine resources given by the virtual machine OS 301 and provide various services to application programs managed by the guest OSes 302 and 303. In the example of FIG. 14, the guest OS 302 appears as if it operated on a computer including one MPU 11, two VPUs 12 and one memory 14, and the guest OS 303 appears as if it operated on a computer including one MPU 11, four VPUs 12 and one memory 14. The virtual machine OS 301 manages which one of VPUs 12 of the real resources actually corresponds to a VPU 12 viewed from the guest OS 302 and a VPU 12 viewed from the guest OS 303. The guest OSes 302 and 303 need not be aware of the correspondence.

The virtual machine OS 301 schedules the guest OSes 302 and 303 to allocate all the resources in the computer system to the guest OSes 302 and 303 on a time-division basis. Assume that the guest OS 302 carries out a real-time operation. To perform the operation thirty times per second at an exact pace, the guest OS 302 sets its parameters to the virtual machine OS 301. The virtual machine OS 301 schedules the guest OS 302 to reliably assign necessary operation time to the guest OS 302 once per $1/30$ second. The operation time is assigned to a guest OS that does not require a real-time operation by priority lower than a guest OS that requires a real-time operation. FIG. 15 shows that the guest OSes 302 and 303 run alternately, representing time by the horizontal axis. While the guest OS 302 (OS1) is running, the MPU 11 and all the VPUs 12 are used as resources of the guest OS 302 (OS1). While the guest OS 303 (OS2) is running, the MPU 11 and all the VPUs 12 are used as resources of the guest OS 303 (OS2).

FIG. 16 shows an operation mode different from that in FIG. 15. There is a case where it is to be wished that a VPU 12 be used continuously according to target applications. This case corresponds to, for example, an application that necessitates continuing to monitor data and events all the time. The scheduler of the virtual machine OS 301 manages the schedule of a specific guest OS such that the guest OS occupies a specific VPU 12. In FIG. 16, a VPU 3 is designated as a resource exclusively for a guest OS 302 (OS1). Even though the virtual machine OS 301 switches the guest OS 302 (OS1) and guest OS 303 (OS2) to each other, the VPU 3 always continues to operate under the control of the guest OS 302 (OS1).

Figure 17:
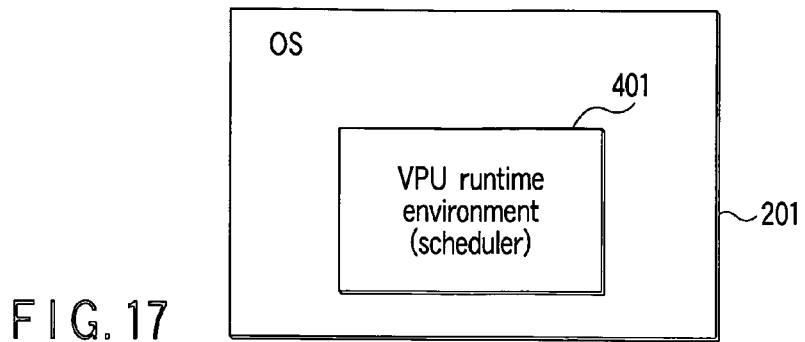
FIG. 17 is a diagram of VPU runtime environment used as a scheduler in the real-time processing system according to the embodiment of the present invention.
Figure 18:
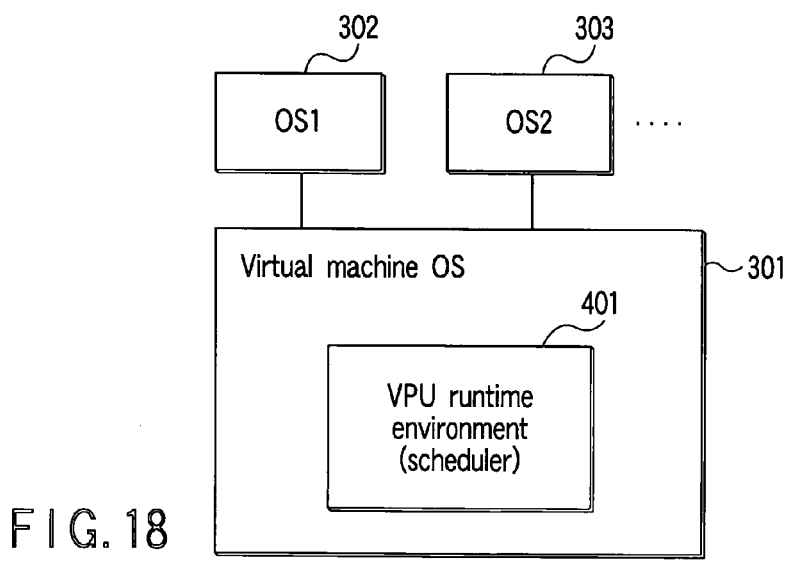
FIG. 18 is a diagram showing an example of VPU runtime environment that is implemented in the virtual machine OS used in the real-time processing system according to the embodiment of the present invention.

In order to execute programs using a plurality of VPUs 12 in the present embodiment, a software module called a VPU runtime environment is used. The soft module includes a scheduler for scheduling threads to be assigned to the VPUs 12. When only one OS 201 is implemented on the computer system of the present embodiment, a VPU runtime environment 401 is implemented on the OS 201 as illustrated in FIG. 17. The VPU runtime environment 401 can be implemented in the kernel of the OS 201 or in a user program. It can also be divided into two for the kernel and user program to run in cooperation with each other. When one or more guest OSes run on the virtual machine OS 301, the following modes are provided to implement the VPU runtime environment 401:

1. Mode of implementing the VPU runtime environment 401 in the virtual machine OS 301 (FIG. 18).

Figure 19:
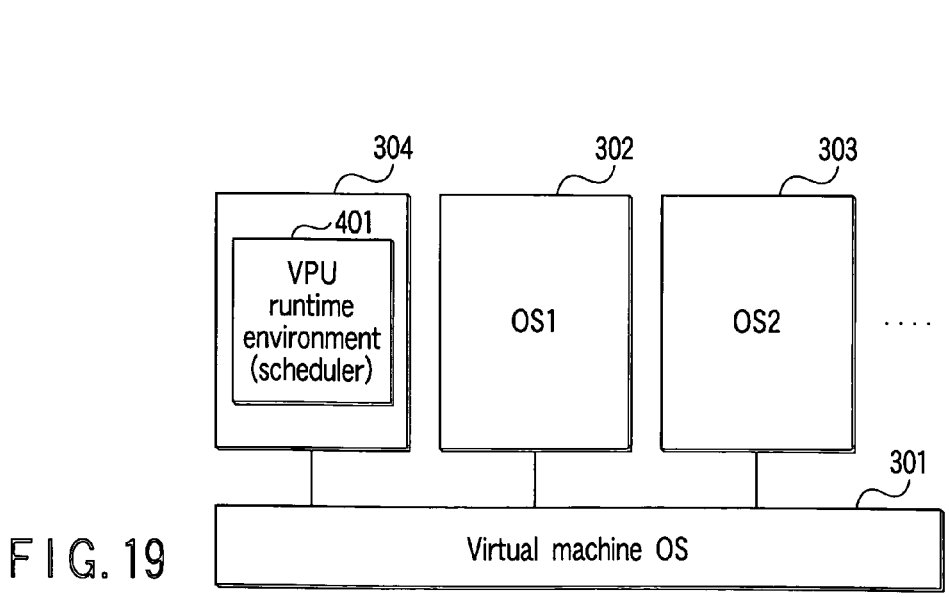
FIG. 19 is a diagram showing an example of VPU runtime environment that is implemented as a guest OS used in the real-time processing system according to the embodiment of the present invention.

2. Mode of implementing the VPU runtime environment 401 as one OS managed by the virtual machine OS 301 (FIG. 19). In FIG. 19, the guest OS 304 running on the virtual machine OS 301 is the VPU runtime environment 401.

Figure 20:
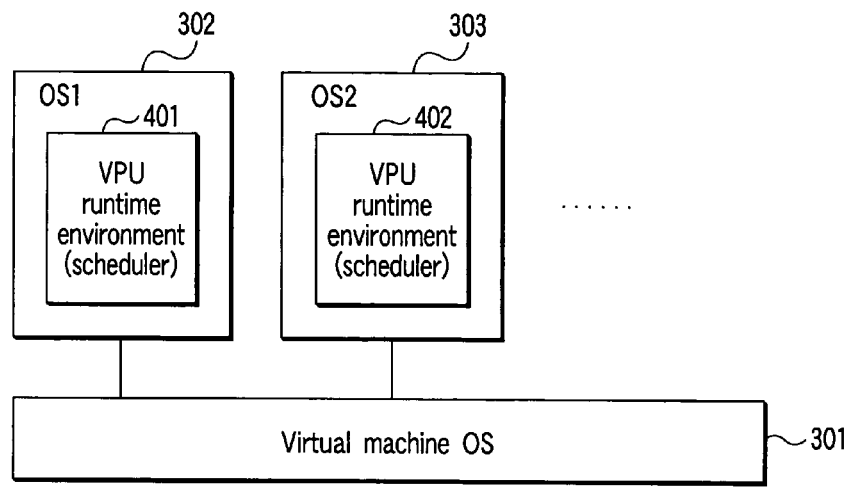
FIG. 20 is a diagram showing an example of VPU runtime environment that is implemented in each of the guest OSes used in the real-time processing system according to the embodiment of the present invention.

3. Mode of implementing a dedicated VPU runtime environment in each of the guest OSes managed by the virtual machine OS 301 (FIG. 20). In FIG. 20, the VPU runtime environments 401 and 402 are implemented in their respective guest OSes 302 and 303. The VPU runtime environments 401 and 402 run in association with each other, if necessary, using a function of communication between the guest OSes provided by the virtual machine OS 301.

Figure 21:
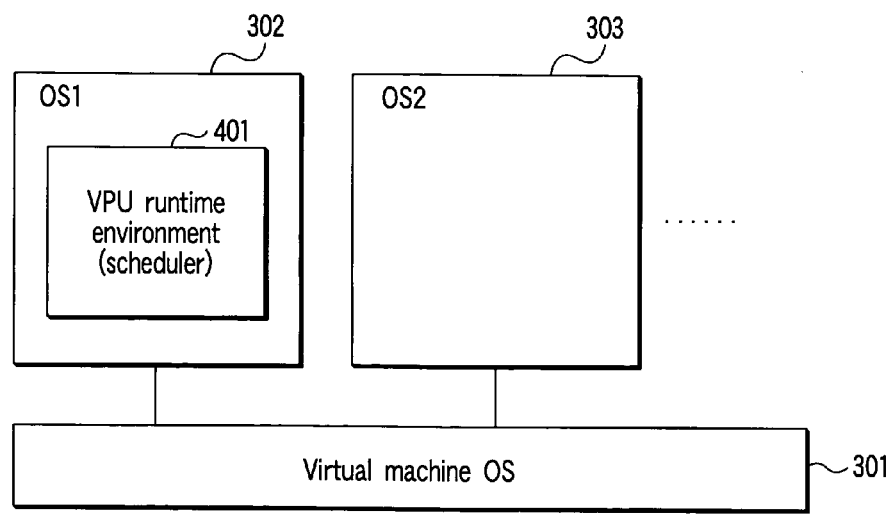
FIG. 21 is a diagram showing an example of VPU runtime environment that is implemented in one guest OS used in the real-time processing system according to the embodiment of the present invention.

4. Mode of implementing the VPU runtime environment 401 in one of the guest OSes managed by the virtual machine OS 301 (FIG. 21). A guest OS 303 having no VPU runtime environment utilizes the VPU runtime environment 401 of a guest OS 302 using a function of communication between the guest OSes provided by the virtual machine OS 301.

The above modes have the following merits:

Merits of Mode 1

The scheduling of a guest OS managed by the virtual machine OS 301 and that of the VPUs can be combined into one. Thus, the scheduling can be done efficiently and finely and the resources can be used effectively; and Since the VPU runtime environment can be shared among a plurality of guest OSes, a new VPU runtime environment need not be created when a new guest OS is introduced.

Merits of Mode 2

Since a scheduler for the VPUs can be shared among guest OSes on the virtual machine OS, the scheduling can be performed efficiently and finely and the resources can be used effectively;

Since the VPU runtime environment can be shared among a plurality of guest OSes, a new VPU runtime environment need not be created when a new guest OS is introduced; and Since the VPU runtime environment can be created without depending upon the virtual machine OS or a specific guest OS, it can be standardized easily and replaced with another. If a VPU runtime environment suitable for a specific embedded device is created to perform scheduling utilizing the characteristics of the device, the scheduling can be done with efficiency.

Merit of Mode 3

Since the VPU runtime environment can optimally be implemented in each guest OS, the scheduling can be performed efficiently and finely and the resources can be used effectively.

Merit of Mode 4

Since the VPU runtime environment need not be implemented in all the guest OSes, a new guest OS is easy to add.

As is evident from the above, all the modes 1 to 4 can be used to implement the VPU runtime environment. Any other modes can be used when the need arises.

Service Provider

In the computer system according to the present embodiment, the VPU runtime environment 401 provides various services (a communication function using a network, a function of inputting/outputting files, calling a library function such as a codec, interfacing with a user, an input/output operation using an I/O device, reading of date and time, etc.) as well as functions of managing and scheduling various resources (operation time of each VPU, a memory, bandwidth of a connection device, etc.) associated with the VPUs 12. These services are called from application programs running on the VPUs 12. If a simple service is called, it is processed by service programs on the VPUs 12. A service that cannot be processed only by the VPUs 12, such as communication processing and file processing, is processed by service programs on the MPU 11. The programs that provide such services are referred to as a service provider (SP).

Figure 22:
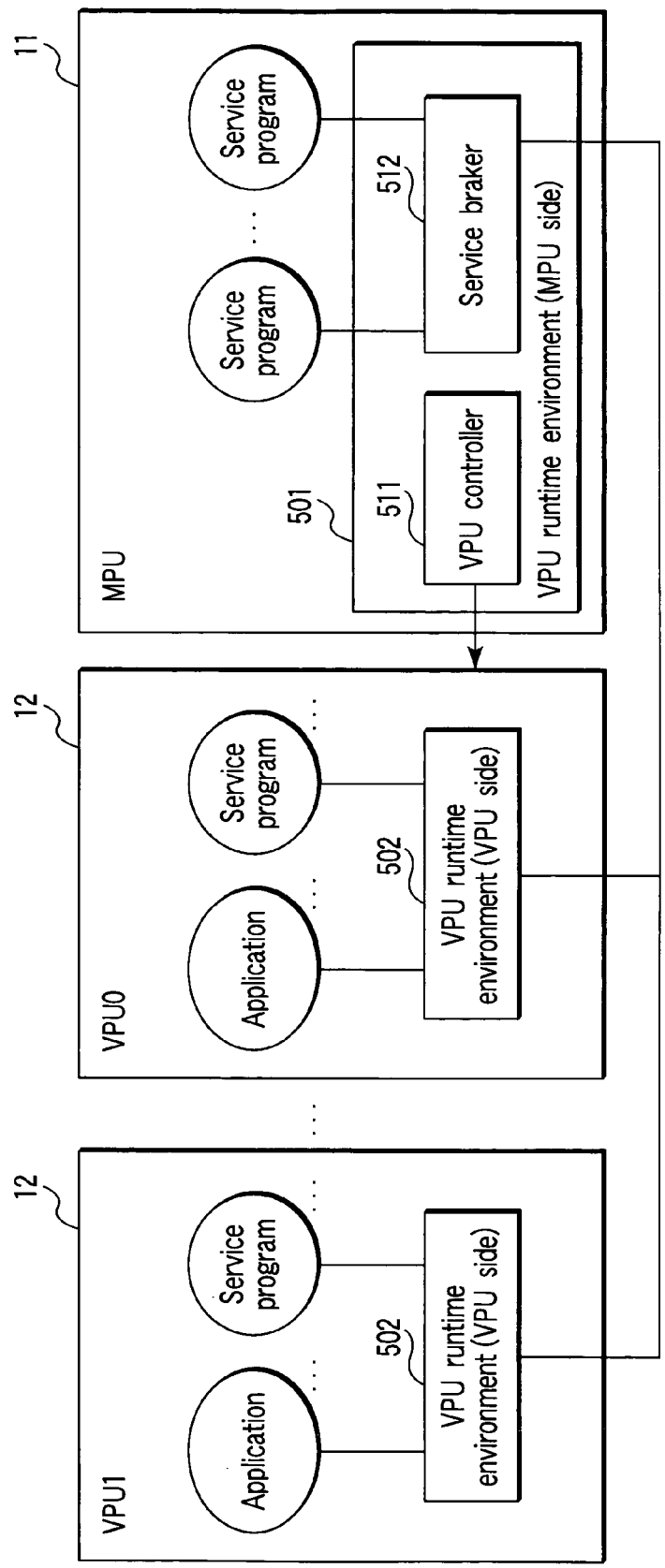
FIG. 22 is an illustration of MPU-side VPU runtime environment and VPU-side VPU runtime environment used in the real-time processing system according to the embodiment of the present invention.

FIG. 22 shows one example of the VPU runtime environment. The principal part of the VPU runtime environment is present on the MPU 11 and corresponds to an MPU-side VPU runtime environment 501. A VPU-side VPU runtime environment 502 is present on each of the VPUs 12 and has only the minimum function of carrying out a service that can be processed in the VPU 12. The function of the MPU-side VPU runtime environment 501 is roughly divided into a VPU controller 511 and a service broker 512. The VPU controller 511 chiefly provides a management mechanism, a synchronization mechanism, a security management mechanism and a scheduling mechanism for various resources (operation time of each VPU, a memory, a virtual space, bandwidth of a connection device, etc.) associated with the VPUs 12. It is the VPU controller 511 that dispatches programs to the VPUs 12 based on the results of scheduling. Upon receiving a service request called by the application program on each VPU 12, the service broker 512 calls an appropriate service program (service provider) and provides the service.

Upon receiving a service request called by the application program on each VPU 12, the VPU-side VPU runtime environment 502 processes only services that are processable in the VPU 12 and requests the service broker 512 to process services that are not processable therein.

Figure 23:
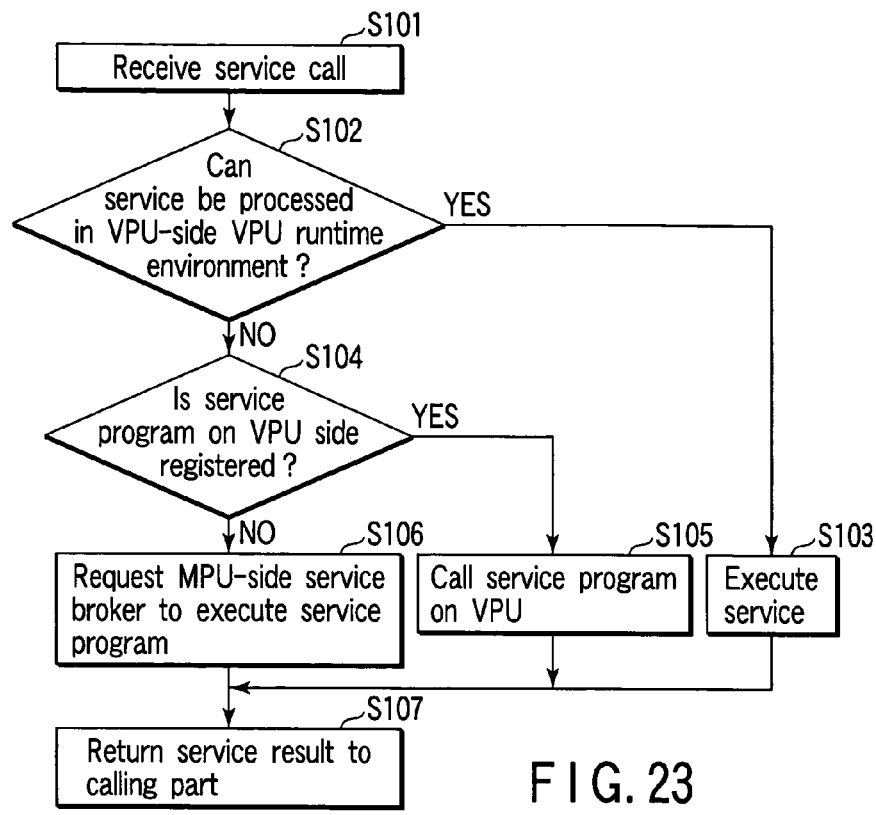
FIG. 23 is a flowchart showing a procedure performed by the VPU-side VPU runtime environment used in the real-time processing system according to the embodiment of the present invention.

FIG. 23 shows a procedure for processing a service request by the VPU-side VPU runtime environment 502. Upon receiving a service call from an application program (step S101), the VPU-side VPU runtime environment 502 determines whether the service can be processed therein (step S102). If the service can be processed, the VPU runtime environment 502 executes the service and returns its result to the calling part (steps S103 and S107). If not, the VPU runtime environment 502 determines whether a service program that can execute the service is registered as one executable on each VPU 12 (step S104). If the service program is registered, the VPU runtime environment 502 executes the service program and returns its result to the calling part (steps S105 and S107). If not, the VPU runtime environment 502 requests the service broker 512 to execute the service program and returns a result of the service from the service broker 512 to the calling part (steps S106 and S107).

Figure 24:
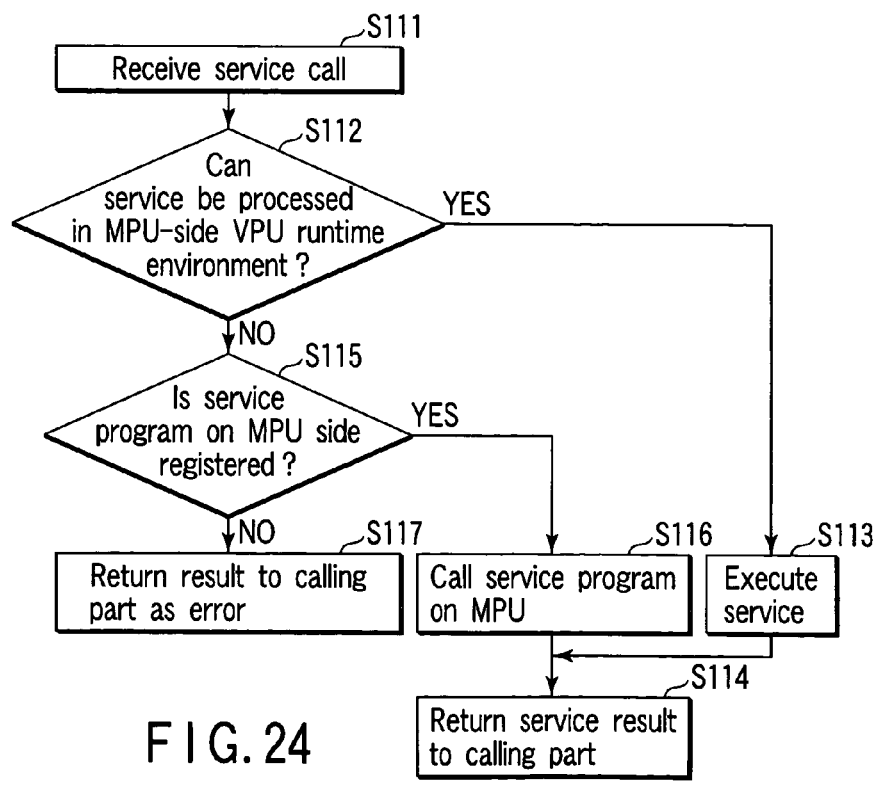
FIG. 24 is a flowchart showing a procedure performed by the MPU-side VPU runtime environment used in the real-time processing system according to the embodiment of the present invention.

FIG. 24 shows a procedure for processing a service, which is requested by the VPU-side VPU runtime environment 502, by the service broker 512 of the MPU-side VPU runtime environment 501. Upon receiving a service call from the VPU-side VPU runtime environment 502 (step S111), the service broker 512 determines whether the service can be processed in the VPU runtime environment 501 (step S112). If the service can be processed, the service broker 512 executes the service and returns its result to the VPU-side VPU runtime environment 502 of the calling part (steps S113 and S114). If not, the service broker 512 determines whether a service program that can execute the service is registered as one executable on the MPU 11 (step S114). If the service program is registered, the service broker 512 executes the service program and returns its result to the VPU-side VPU runtime environment 502 of the calling part (steps S116 and S114). If not, the service broker 512 returns an error to the VPU-side VPU runtime environment 502 of the calling part (step S117).

Results reply to some service requests issued from the program to be executed by each VPU 12, and no results reply to other service requests. The destination of the reply is usually a thread that issues a service request; however, another thread, a thread group or a process can be designated as the destination of the reply. It is thus favorable that the destination be included in a message to request a service. The service broker 512 can be realized using a widely used object request broker.

Real-Time Operation

The computer system according to the present embodiment serves as a real-time processing system. The operations to be performed by the real-time processing system are roughly divided into the following three types:

1. Hard real-time operation
2. Soft real-time operation
3. Best effort operation (non-real-time operation)

The hard and soft real-time operations are a so-called real-time operation. The real-time processing system of the present embodiment has concepts of both thread and process like a number of existing OSes. First, the thread and process in the real-time processing system will be described.

The thread has the following three classes:

1. Hard Real-Time Class

Timing requirements are very important. This thread class is used for such an important application as to cause a grave condition when the requirements are not met.

2. Soft real-time class

This thread class is used for an application whose quality simply lowers even if the timing requirements are not met.

3. Best effort class

This thread class is used for an application including no timing requirements.

In the present embodiment, the thread is a unit of execution for the real-time operation. The threads have their related programs that are to be executed by the threads. Each of the threads holds its inherent information that is called a thread context. The thread context contains, for example, information of a stack and values stored in the register of the processor.

In the real-time processing system, there are two different threads of MPU and VPU threads. These two threads are classified by processors (MPU 11 and VPU 12) that execute the threads and their models are identical with each other.

The thread context of the VPU thread includes the contents of the local storage 32 of the VPU 12 and the conditions of a DMA controller of the memory controller 33.

A group of threads is called a thread group. The thread group has the advantage of efficiently and easily performing, e.g., an operation of giving the same attribute to the threads of the group. The thread group in the hard or soft real-time class is roughly divided into a tightly coupled thread group and a loosely coupled thread group. The tightly coupled thread group and loosely coupled thread group are discriminated from each other by attribute information (coupling attribute information) added to the thread groups. The coupling attribute of the thread groups can explicitly be designated by the codes in the application programs or the above-described structural description.

The tightly coupled thread group is a thread group that is made up of threads running in cooperation with each other. In other words, the threads belonging to the tightly coupled thread group tightly collaborate with each other. The tightly collaboration implies an interaction such as frequent communication and synchronization between threads or an interaction that decreases in latency. The threads belonging to the same tightly coupled thread group are always executed simultaneously. On the other hand, the loosely coupled thread group is a thread group that obviates a tightly collaboration between threads belonging to the group. The threads belonging to the loosely coupled thread group carry out communications for transferring data through the buffer on the memory 14.

Tightly Coupled Thread Group

Figure 25:
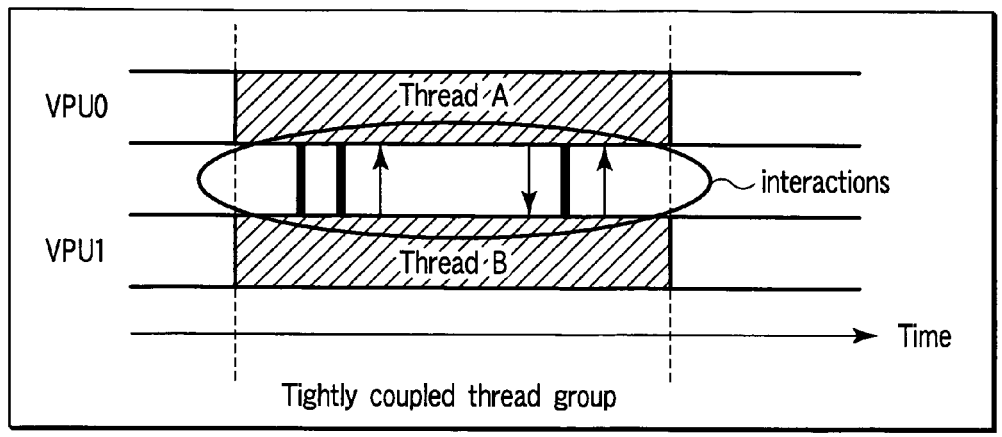
FIG. 25 is an illustration of threads belonging to a tightly coupled thread group and executed by different processors in the real-time processing system according to the embodiment of the present invention.

As shown in FIG. 25, different VPUs are allocated to the threads of the tightly coupled thread group and the threads are executed at the same time. These threads are called tightly coupled threads. The execution terms of the tightly coupled threads are reserved in their respective VPUs, and the tightly coupled threads are executed at the same time. In FIG. 25, a tightly coupled thread group includes two tightly coupled threads A and B and the threads A and B are executed at once by the VPU0 and VPU1, respectively. The real-time processing system of the present embodiment ensures that the threads A and B are executed at once by different VPUs. One of the threads can directly communicate with the other thread through a local storage or control register of the VPU that executes the other thread.

Figure 26:
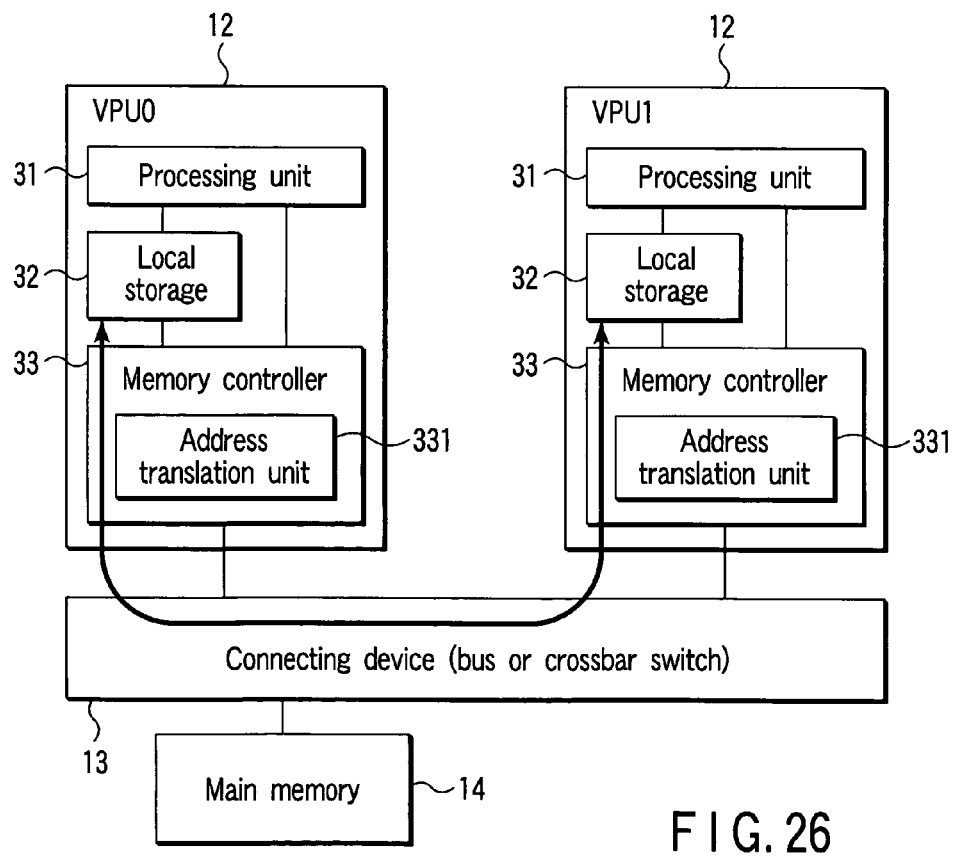
FIG. 26 is an illustration of interaction between tightly coupled threads in the real-time processing system according to the embodiment of the present invention.

FIG. 26 illustrates communication between threads A and B, which is performed through the local storages of VPU0 and VPU1 that execute the threads A and B, respectively.

In the VPU0 that executes the thread A, an RA space corresponding to the local storage 32 of the VPU1 that executes the thread B is mapped in part of an EA space of the thread A. For this mapping, an address translation unit 331 provided in the memory controller 33 of the VPU0 performs address translation using a segment table and page table. The address translation unit 331 converts (translates) a part of the EA space of the thread A to the RA space corresponding to the local storage 32 of the VPU1, thereby to map the RA space corresponding to the local storage 32 of the VPU1 in part of the EA space of the thread A.

In the VPU1 that executes the thread B, an RA space corresponding to the local storage 32 of the VPU0 that executes the thread A is mapped in part of an EA space of the thread B. For this mapping, an address translation unit 331 provided in the memory controller 33 of the VPU1 performs address translation using the segment table and page table. The address translation unit 331 converts a part of the EA space of the thread B to the RA space corresponding to the local storage 32 of the VPU0, thereby to map the RA space corresponding to the local storage 32 of the VPU0 in part of the EA space of the thread B.

FIG. 27 shows mapping of local storage (LS1) 32 of the VPU1 executing the thread B in the EA space of the thread A executed by the VPU0 and mapping of local storage (LS0) 32 of the VPU0 executing the thread A in the EA space of the thread B executed by the VPU1. For example, when data to be transferred to the thread B is prepared on the local storage LS0, the thread A sets a flag indicative of this preparation in the local storage LS0 of the VPU0 or the local storage LS1 of the VPU1 that executes the thread B. In response to the setting of the flag, the thread B reads the data from the local storage LS0.

According to the present embodiment described above, tightly coupled threads can be specified by the coupling attribute information, and the tightly coupled threads A and B are sure to be executed at once by different VPUs, respectively. Thus, an interaction of communication and synchronization between the threads A and B can be performed more lightly without delay.

Loosely Coupled Thread Group

Figure 29:
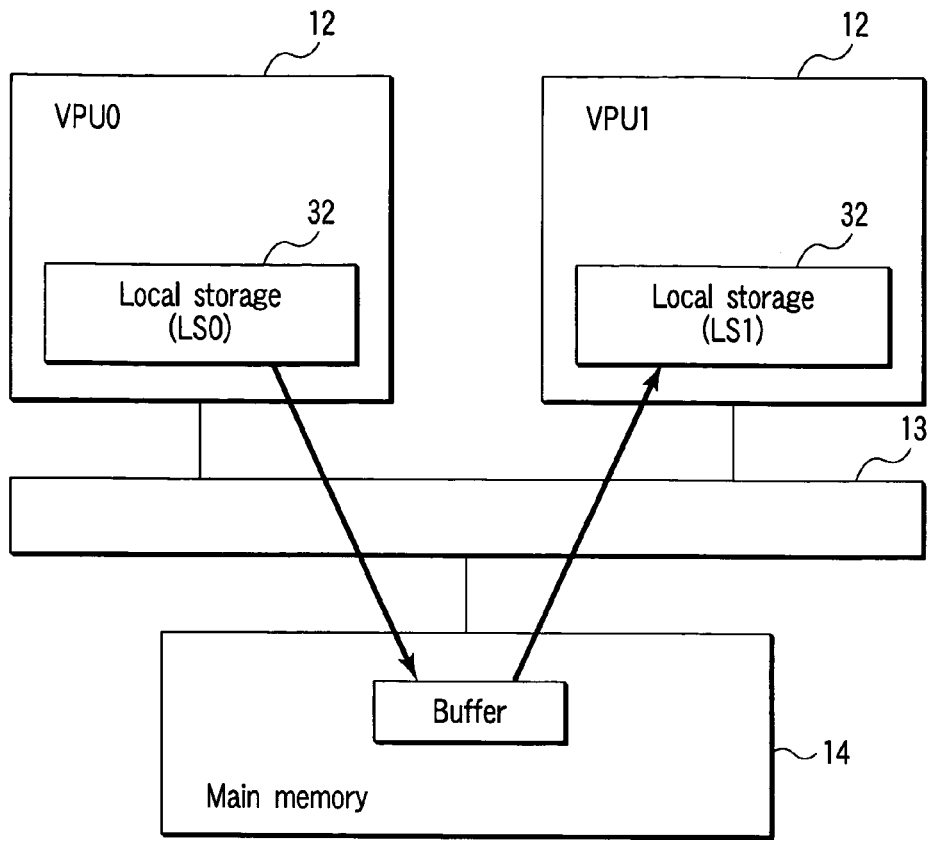
FIG. 29 is an illustration of interaction between loosely coupled threads in the real-time processing system according to the embodiment of the present invention.

The execution term of each of threads belonging to the loosely coupled thread group depends upon the relationship in input/output between the threads. Even though the threads are subject to no constraints of execution order, it is not ensured that they are executed at the same time. The threads belonging to the loosely coupled thread group are called loosely coupled threads. FIG. 28 shows a loosely coupled thread group including two threads C and D as loosely coupled threads, which are executed by their respective VPU0 and VPU1. The threads C and D differ in execution term as is apparent from FIG. 28. Communication between the threads C and D is carried out by the buffer prepared on the main memory 14 as shown in FIG. 29. The thread C executed by the VPU0 writes data, which is prepared in the local storage LS0, to the buffer prepared on the main memory 14 by DMA transfer. The thread D executed by the VPU1 reads data from the buffer on the main memory 14 and writes it to the local storage LS1 by DMA transfer when the thread D starts to run.

Process and Thread

Figure 30:
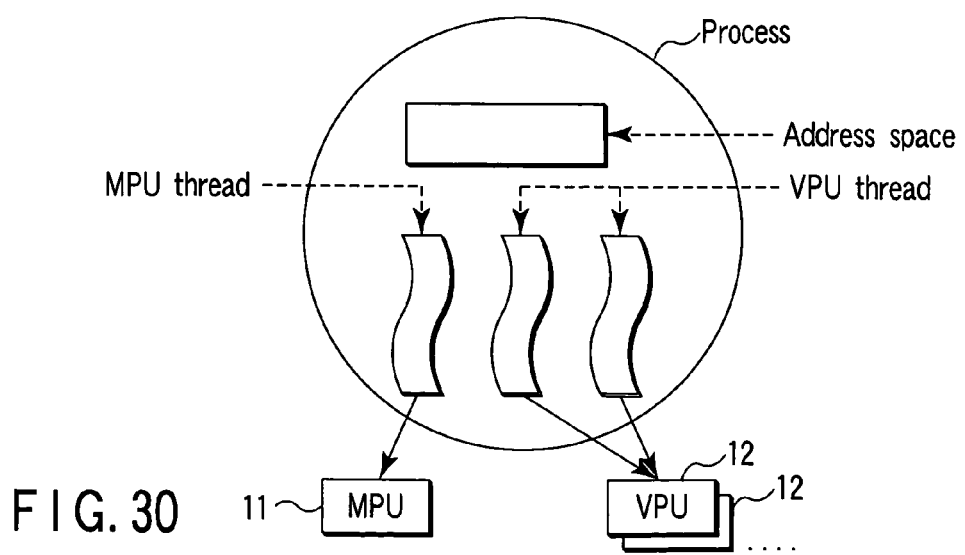
FIG. 30 is an illustration of a relationship between processes and threads in the real-time processing system according to the embodiment of the present invention.

As shown in FIG. 30, a process includes one address space and one or more threads. The threads can be included in the process regardless of their number and type. For example, only VPU threads can be included in the process and so can be a mixture of VPU and MPU threads. As a thread holds a thread context as its inherent information, a process holds a process context as its inherent information. The process context contains both an address space inherent in the process and thread contexts of all threads included in the process. The address space can be shared among all the threads of the process. One process can include a plurality of thread groups, but one thread group cannot belong to a plurality of processes. Thus, a thread group belonging to a process is inherent in the process.

In the real-time processing system of the present embodiment, there are two models of a thread first model and an address space first model as method for creating a new thread. The address space first model is the same as that adopted in the existing OS and thus can be applied to both the MPU and VPU threads. On the other hand, the thread first model can be applied only to the VPU threads and is peculiar to the real-time processing system of the present embodiment. In the thread first model, the existing thread (which is one for creating a new thread, i.e., a parent thread of the new thread) first designates a program to be executed by a new thread and causes the new thread to start to execute the program. The program is then stored in the local storage of the VPU and starts to run from a given address. Since no address space is related to the new thread at this time, the new thread can gain access to the local storage of the VPU and not to the memory 14. After that, when the need arises, the new thread in itself calls a service of VPU runtime environment and creates an address space. The address space is related to the new thread, and the new thread can gain access to the memory 14. In the address space first model, the existing thread creates a new address space or designates the existing address space, and arranges program, which is to execute by the new thread, in the address space. Then, the new thread starts to run the programs. The merit of the thread first model is that a thread can be executed only by the local storage to reduce overhead costs required for generating, dispatching and exiting the thread.

Scheduling of Threads

Figure 31:
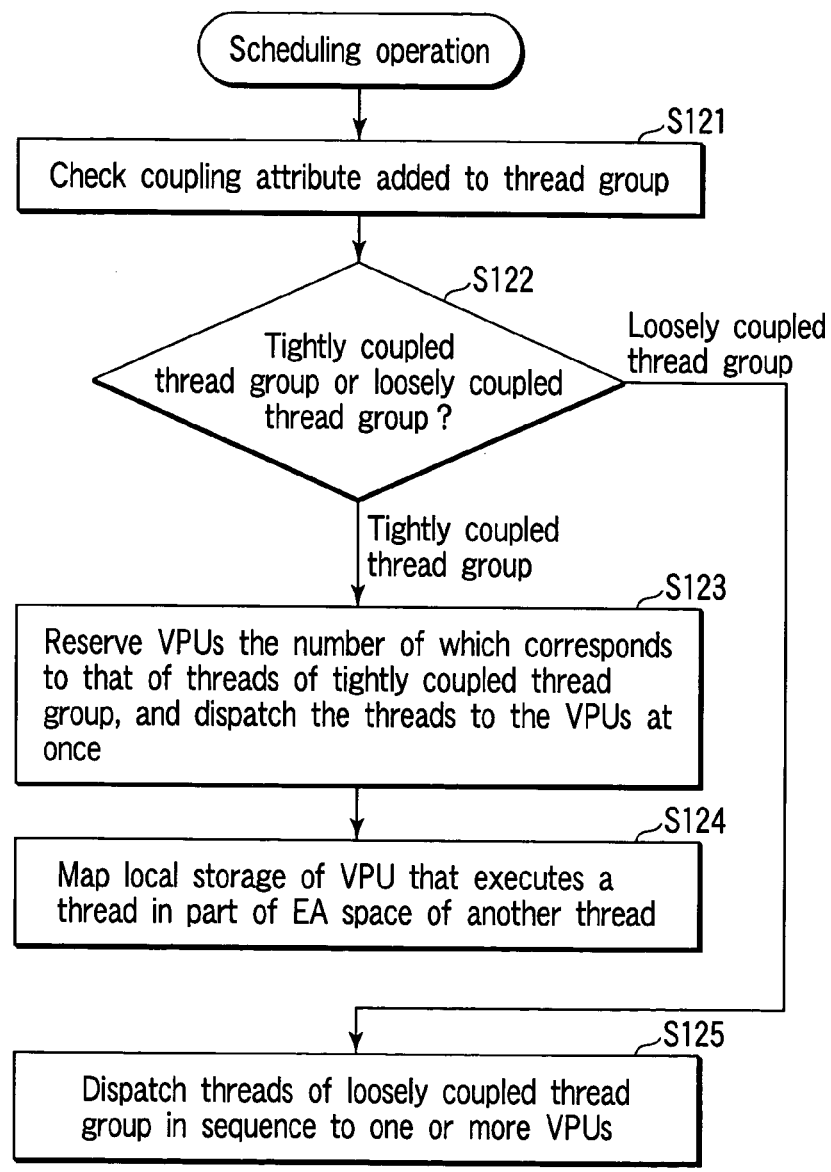
FIG. 31 is a flowchart showing a procedure for performing a scheduling operation in the real-time processing system according to the embodiment of the present invention.

A scheduling operation performed by the VPU runtime environment 401 will now be described with reference to the flowchart shown in FIG. 31. The scheduler in the VPU runtime environment 401 checks a coupling attribute between threads based on coupling attribute information added to each group of threads to be scheduled (step S121). The scheduler determines whether each thread group is a tightly coupled thread group or a loosely coupled thread group (step S122). The coupling attribute is checked referring to the descriptions of threads in program codes or thread parameters in the above structural description 117. If the tightly and loosely coupled thread groups are each specified, the threads to be scheduled are separated into the tightly and loosely coupled thread groups.

The scheduling of threads belonging to the tightly coupled thread group is performed as follows. In order to execute threads of a tightly coupled thread group, which are selected from the threads to be scheduled, by their respective VPUs at once, the scheduler in the VPU runtime environment 401 reserves an execution term of each of the VPUs, whose number is equal to that of the threads, and dispatches the threads to the VPUs at once (step S123). The scheduler maps an RA space in part of an EA space of a thread using the address translation unit 331 in a VPU that executes the thread (step S124), the RA space corresponding to the local storage of a VPU that executes a partner thread interacting with the former thread. As for the threads belonging to the loosely coupled thread group which are selected from the threads to be scheduled, the scheduler dispatches the threads in sequence to one or more VPUs based on the relationship in input/output between the threads (step S125).

If a tightly coupled thread group, which is a set of threads running in cooperation with each other, is selected based on the coupling attribute information, it can be ensured that the threads belonging to the tightly coupled thread group are executed at once by different processors. Consequently, communication between threads can be achieved by a lightweight mechanism of gaining direct access to, e.g., the registers of processors that execute their partner threads each other. The communication can thus be performed lightly and quickly.

Mapping of Local Storage

In the real-time processing system of the present embodiment, when MPU and VPU threads or VPU threads perform an operation of communication or synchronization in cooperation with each other, it is necessary to access the local storage of the partner VPU thread. For example, a more lightweight, high-speed synchronization mechanism is implemented by a synchronous variable assigned on the local storage. It is thus necessary that the local storage of a VPU 12 be accessed directly by another VPU 12 or the MPU 11. If a segment table or page table is set appropriately when the local storage of a VPU 12 is allocated to the real address space as shown in FIG. 4, the local storage of a partner VPU 12 can directly be accessed. This case however raises two large issues.

Figure 32:
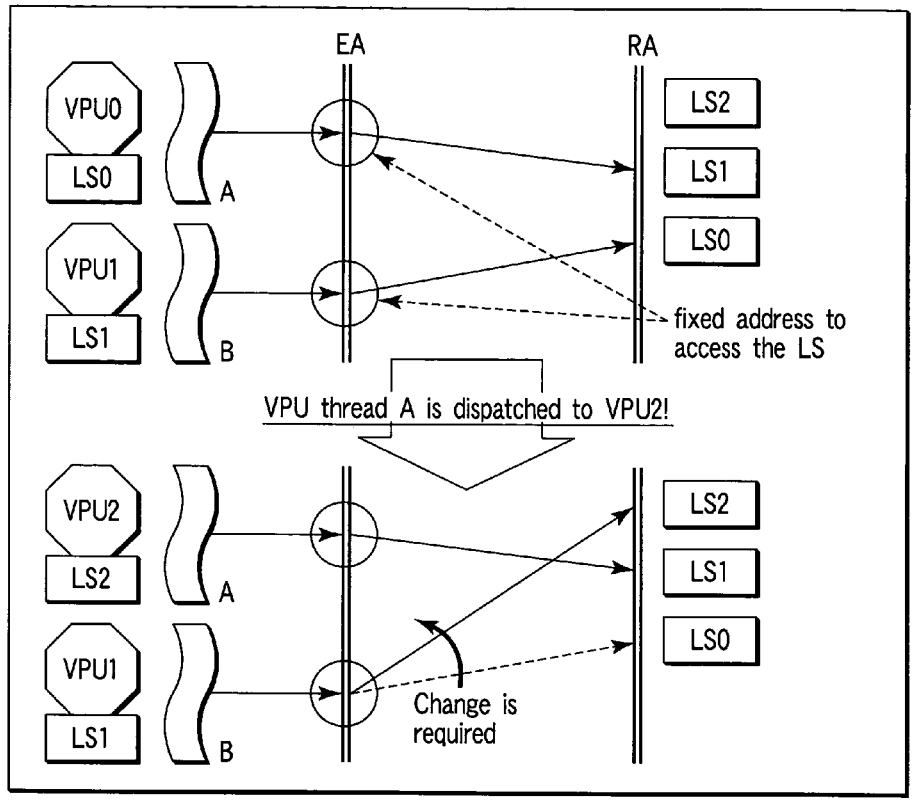
FIG. 32 is an illustration of a first issue of mapping of local storages in the real-time processing system according to the embodiment of the present invention.

The first issue relates to a change in the VPU to which a VPU thread is dispatched. Assume that there are VPU threads A and B and they are executed by their respective VPUs 0 and 1 as shown in FIG. 32. Assume that the VPU threads A and B map the LSes (local storages) of their partner threads in their own EA spaces in order to cooperate with each other. Assume that LS0, LS1 and LS2 of VPU0, VPU1 and VPU2 are present in the RA space. In this case, it is the LS of a VPU executing the VPU thread B or the LS1 of the VPU1 that is mapped in the EA space of the VPU thread A. Conversely, it is the LS of a VPU executing the VPU thread A or the LS0 of the VPU0 that is mapped in the EA space of the VPU thread B. Assume that the scheduler of the VPU runtime environment changes a VPU to which the VPU thread A is dispatched and the VPU thread A is executed by the VPU 2. Since the VPU thread A is no longer executed by the VPU0, the LS of the VPU0, which is mapped in the EA space of the VPU thread B, becomes meaningless. In order to prevent the thread B from being aware of the change in the VPU to which the thread A is dispatched, the system needs to use some method for mapping the LS2 in the address of the EA space in which the LS0 is mapped and seeing the LS2 of the VPU2 through the thread B as the local storage of the thread A.

The second issue relates to a correspondence between physical VPUs and logical VPUs. Actually, there are two levels to allocate VPUs to VPU threads. The first level is to allocate logical VPUs to VPU threads and the second level is to allocate physical VPUs to the logical VPUs. The physical VPUs are real VPUs 12 managed by the virtual machine OS 301. The logical VPUs are virtual VPUs allocated to the guest OSes by the virtual machine OS 301. This correspondence is also shown in FIG. 14. If the VPU runtime environment 401 manages the logical VPUs, the VPUs that are allocated to the VPU threads by the VPU runtime environment 401 are logical VPUs in FIG. 32.

Figure 33:
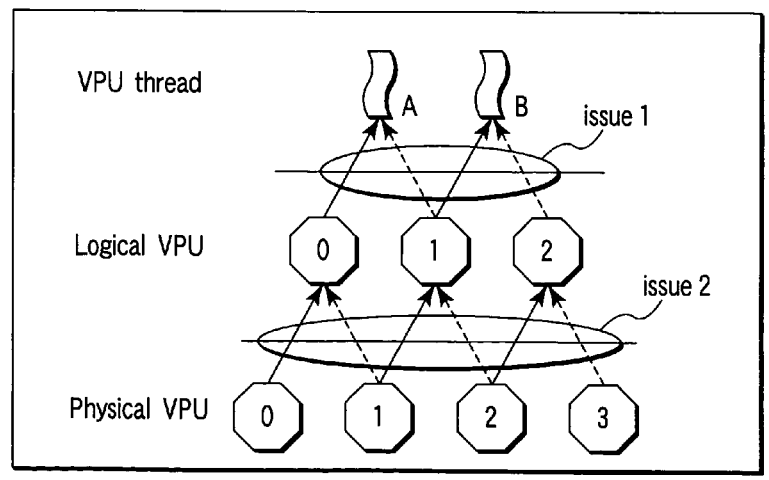
FIG. 33 is an illustration of a relationship between a physical VPU and a logical VPU in the real-time processing system according to the embodiment of the present invention.

FIG. 33 illustrates the concept of the above two level. The first issue corresponds to an issue of the assignment of VPU threads to logical VPUs in the upper stage in FIG. 33. The second issue corresponds to an issue of the allocation of physical VPUs to logical VPUs in the lower stage in FIG. 33. In FIG. 33, three are selected from four physical VPUs and allocated to three logical VPUs, respectively. When a correspondence between the physical and logical VPUs changes, the setting needs to be changed appropriately even though the allocation of logical VPUs to VPU threads does not change. For example, the entries of the page table corresponding to the local storages (LS) have to be replaced to gain correct access to the LS of the changed logical VPU.

Figure 34:
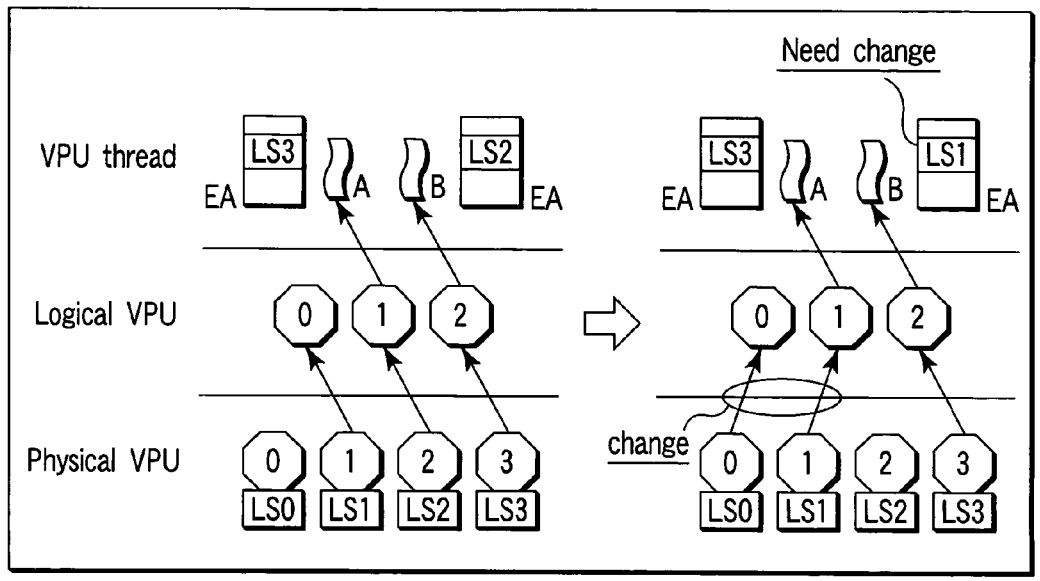
FIG. 34 is an illustration of a second issue of mapping of local storages in the real-time processing system according to the embodiment of the present invention.

Assume that the virtual machine OS 301 allocates physical VPUs 1, 2 and 3 to their respective logical VPUs 0, 1, 2 at a certain time, as shown in FIG. 34. In FIG. 34, the logical VPU1 is allocated to VPU thread A and logical VPU2 is allocated to VPU thread B. The VPU threads A and B map the LSes of the physical VPUs, which execute their partner threads, in their own EA spaces. Specifically, LS3 of the physical VPU3, which executes the VPU thread B, is mapped in the EA space of the VPU thread A, and LS2 of the physical VPU2, which executes the VPU thread A, is mapped in the EA space of the VPU thread B. Assume that the virtual machine OS 301 allocates the physical VPUs 0 and 1 to the logical VPUs 0 and 1 again at a certain time. The physical VPU2, which is allocated to the logical VPU1 that executes the VPU thread A, is changed to the physical VPU1. The allocation of the logical VPUs to the VPU threads does not change, but the correspondence between physical VPUs and logical VPUs changes. It is therefore necessary to change the LS of the physical VPU executing the VPU thread A, which is mapped in the EA space of the VPU thread B, from the LS2 of the physical VPU2 to the LS1 of the physical VPU1 and gain correct access to the LS1 of the physical VPU1.

In order to resolve the above two issues described above, the real-time processing system of the present embodiment controls the virtual memory mechanism such that the local storage of a VPU, which executes its partner thread, is always mapped in the fixed address of the EA space viewed from a thread. In other words, when the scheduler dispatches a logical VPU, or when the virtual machine OS changes a correspondence between physical and logical VPUs, the page table and segment table are rewritten appropriately to allow a thread executed by a VPU to see the local storage of a VPU that executes the partner thread at all times in the same address.

Figure 35:
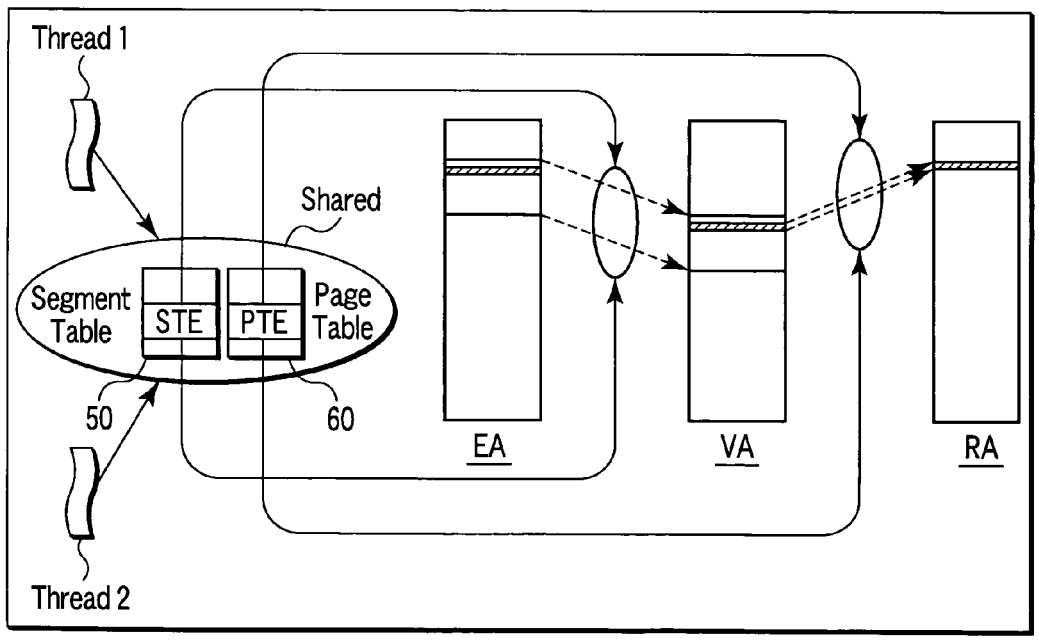
FIG. 35 is an illustration of a shared model of effective address space in the real-time processing system according to the embodiment of the present invention.
Figure 36:
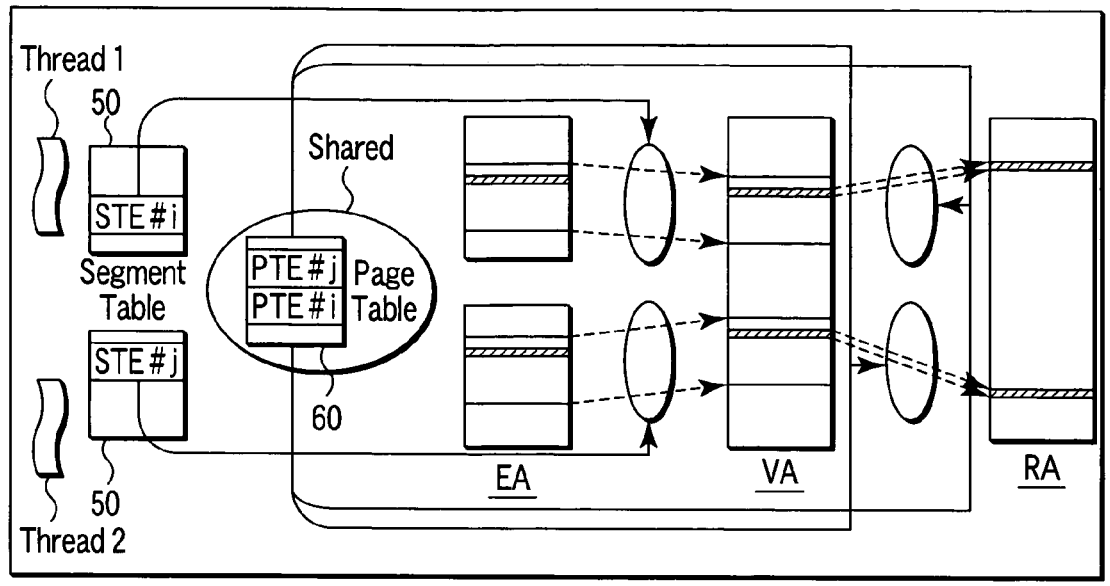
FIG. 36 is an illustration of a shared model of virtual address space in the real-time processing system according to the embodiment of the present invention.
Figure 37:
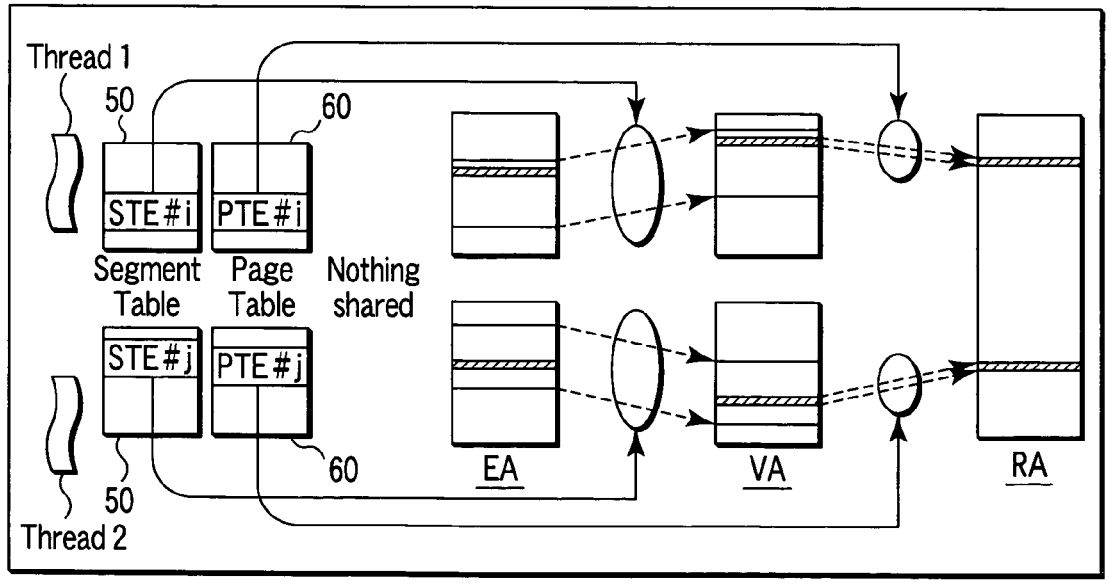
FIG. 37 is an illustration of an unshared model in the real-time processing system according to the embodiment of the present invention.

There now follows an explanation as to the relationship in EA space between two threads. The EA spaces of two threads are shared or unshared in the following three patterns:

1. Shared EA pattern: Two threads 1 and 2 share both the segment table and page table (FIG. 35).
2. Shared VA pattern: Two threads 1 and 2 share the page table and not the segment table but have their respective segment tables (FIG. 36).
3. Unshared pattern: Two threads 1 and 2 share neither the page table nor the segment table but have their respective page tables and segment tables (FIG. 37).

There now follows an explanation as to how the mapping of local storages of VPUs to the EA space are controlled, taking the shared EA type as an example.

Figure 38:
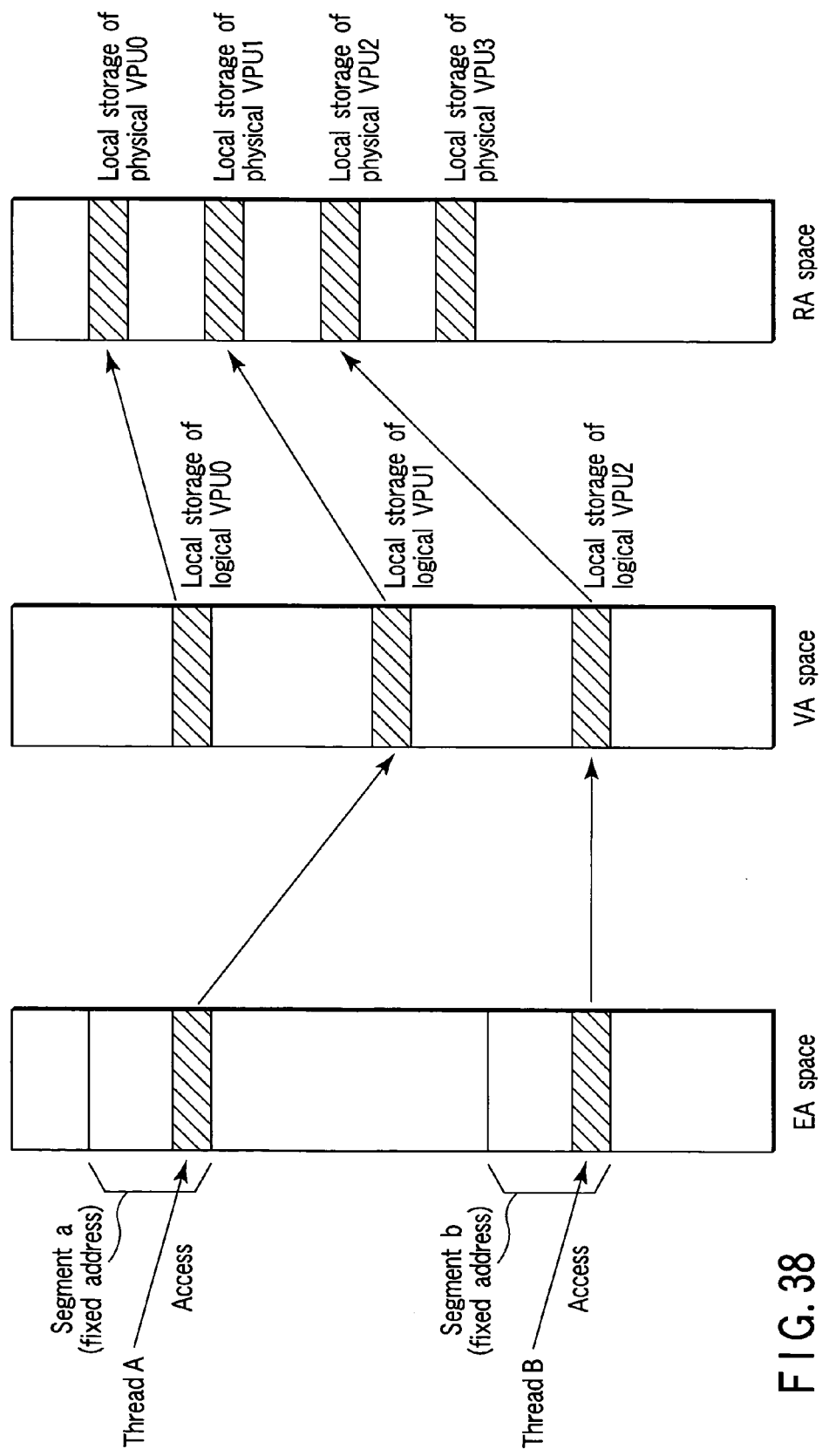
FIG. 38 is a first diagram describing a change in mapping of local storages in the real-time processing system according to the embodiment of the present invention.
Figure 39:
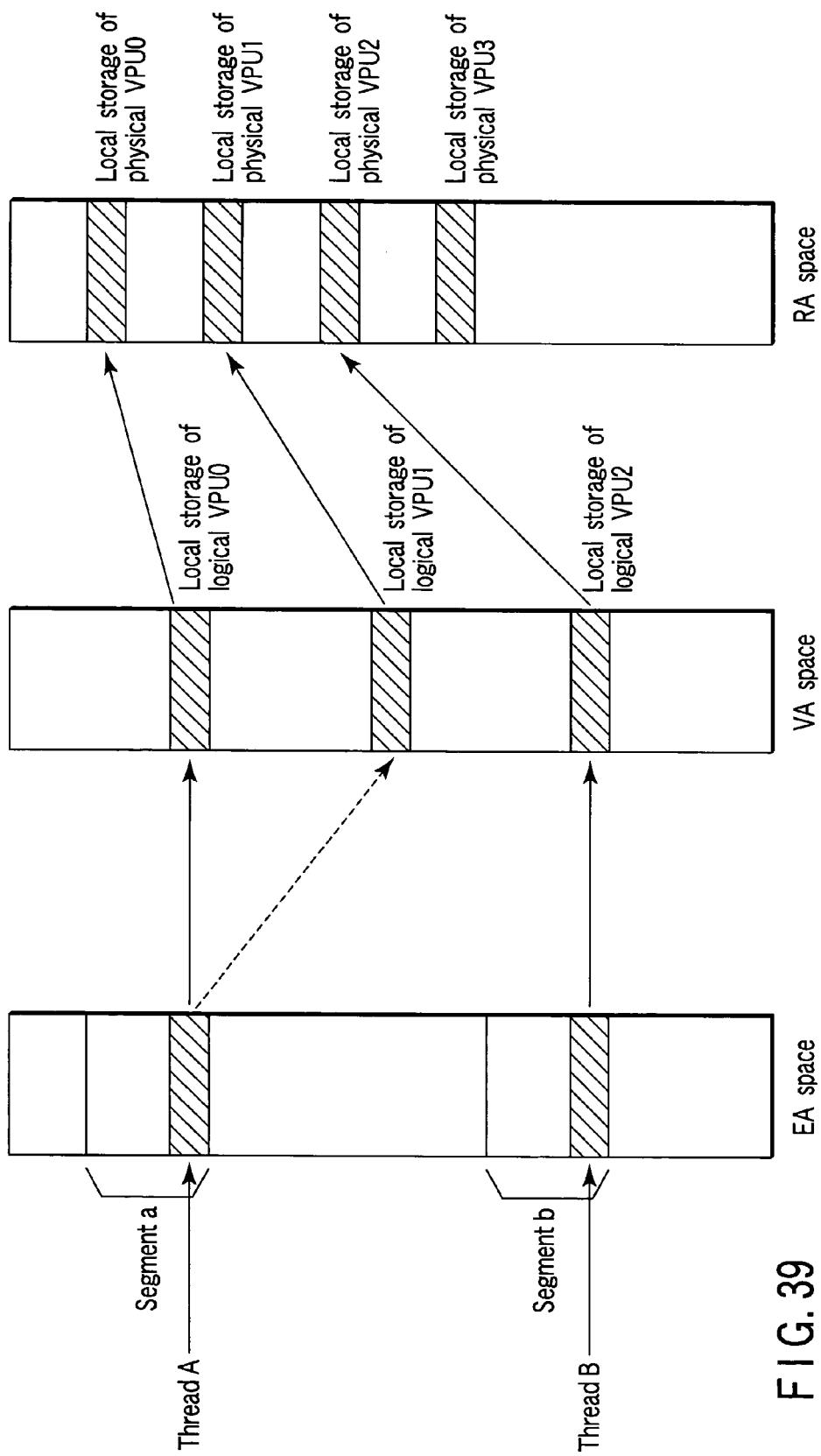
FIG. 39 is a second diagram describing a change in mapping of local storages in the real-time processing system according to the embodiment of the present invention.

First, as shown in FIG. 38, address regions corresponding to the respective logical VPUs are arranged on the VA space. The contents of the page table are set up such that the local storages of physical VPUs corresponding to the logical VPUs are mapped to the address regions corresponding to the local storages of the logical VPUs. In this case, the local storages of the physical VPUs 0, 1 and 2 correspond to the address regions of the local storages of the logical VPUs 0, 1 and 2, respectively. Then, the segment table is set in such a manner that the thread A can see the local storage of a logical VPU that executes the thread B through segment a of a fixed address on the EA space. The segment table is also set in such a manner that the thread B can see the local storage of a logical VPU that executes the thread A through segment b of a fixed address on the EA space. In this case, the thread A is executed by the logical VPU2, and the thread B is executed by the logical VPU1. Assume here that the scheduler in the VPU runtime environment 401 dispatches the thread B to the logical VPU0. Then, the VPU runtime environment 401 automatically rewrites the segment table such that the thread A can see the local storage of the logical VPU0 that executes the thread B through the segment a, as shown in FIG. 39.

Assume here that a correspondence between the physical and logical VPUs changes because the virtual machine OS 301 dispatches the guest OS. As shown in FIG. 40, the VPU runtime environment 401 rewrites the page table such that the address regions of local storages of logical VPUs fixed on the VA space exactly correspond to the local storages of physical VPUs. In FIG. 40, since the physical VPUs 1, 2 and 3 change to the logical VPUs 0, 1 and 2, respectively, the page table is rewritten such that the address regions of local storages of the logical VPUs 0, 1 and 2 correspond to the local storages of the physical VPUs 1, 2 and 3.

As described above, when the logical VPU that executes a thread changes due to the dispatch of the thread, the segment table of mapping from EA space to VA space is rewritten to resolve the first issue. When a correspondence between physical and logical VPUs is changed by the virtual machine OS 301 or the like, the page table of mapping from VA space to RA space is rewritten to resolve the second issue.

The local memory (local storage) of a processor corresponding to the partner thread, which is mapped in the effective address space, is automatically changed in accordance with a processor that executes the partner thread. Thus, each thread can efficiently interact with its partner thread without being aware of a processor to which the partner thread is dispatched. Consequently, a plurality of threads can be executed with efficiency and in parallel to one another.

The shared EA type has been described so far. In the shared VA type and unshared type, too, the first and second issues can be resolved by rewriting the segment table or the page table as in the shared EA type.

Figure 41:
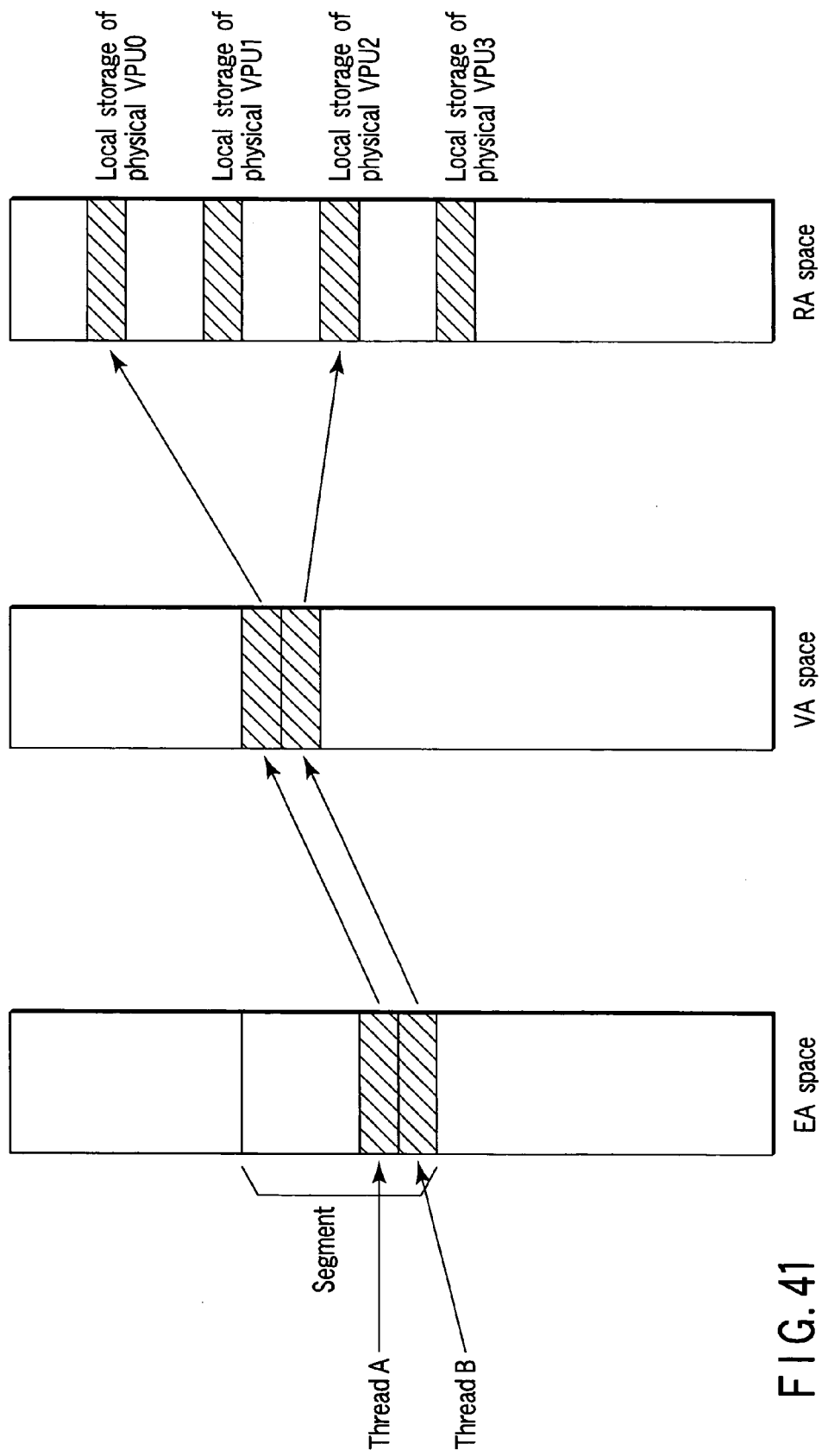
FIG. 41 is a fourth diagram describing a change in mapping of local storages in the real-time processing system according to the embodiment of the present invention.
Figure 42:
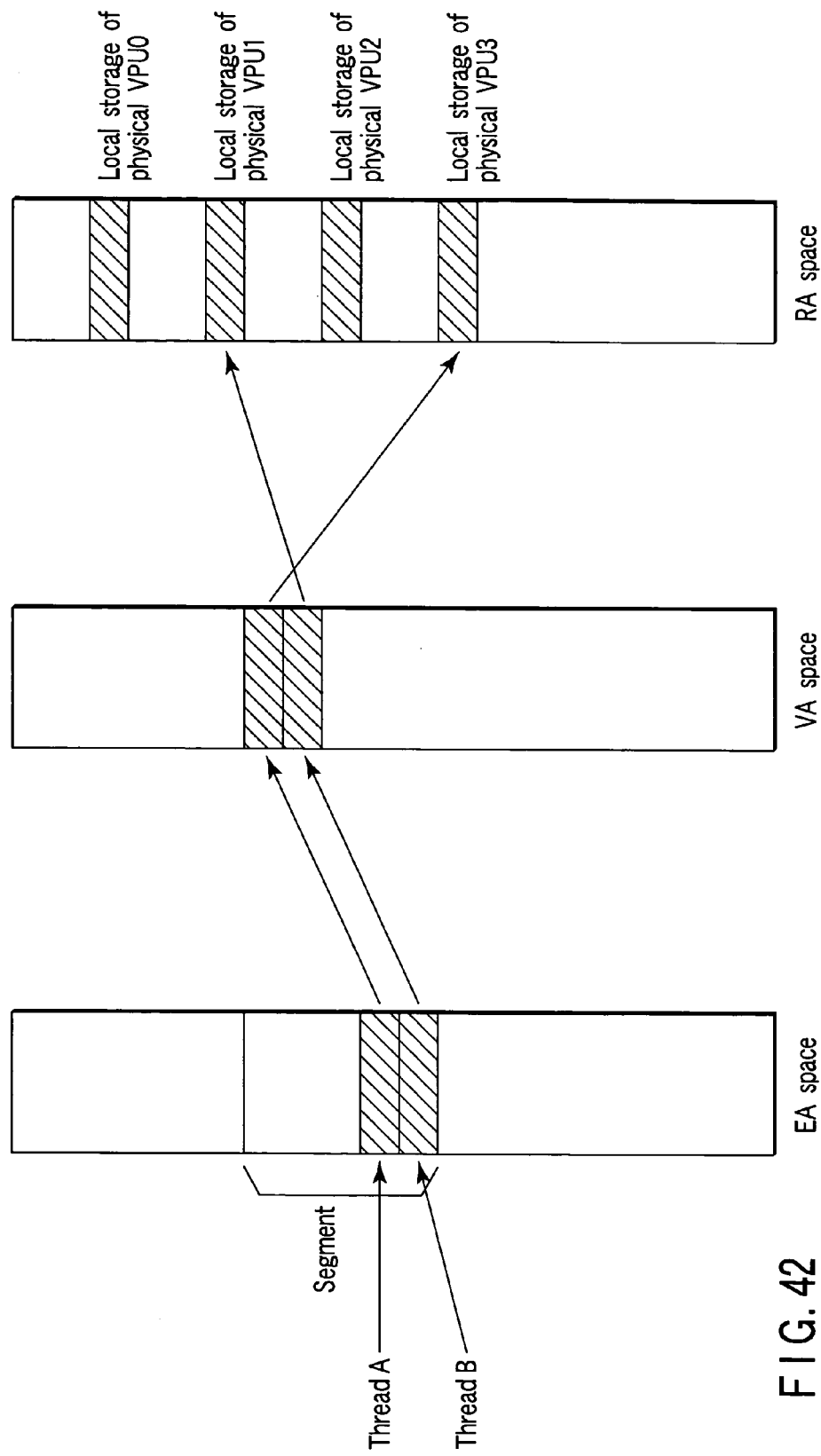
FIG. 42 is a fifth diagram describing a change in mapping of local storages in the real-time processing system according to the embodiment of the present invention.

Another method of resolving the above first and second issues will be described taking the shared EA type as an example. If there are a plurality of VPU threads that run in cooperation with each other, the page table and segment table are set such that the local storages of VPUs that execute the threads are consecutively mapped on the segment in the EA space. In FIG. 41, the thread A is executed by the physical VPU2 and the thread B is executed by the physical VPU0. The page table and segment table are set such that the local storages of the VPUs can consecutively be arranged on the same segment. When the logical VPUs that execute the threads are changed by the scheduler in the VPU runtime environment 401 or the correspondence between physical and logical VPUs is changed by the virtual machine OS or the like, the page table is rewritten to hide these changes from the threads A and B, and the mapping of VA and RA spaces is changed. FIG. 42 shows mapping in the case where the VPU that executes the thread A is changed to the physical VPU1 and the VPU that executes the thread B is changed to the physical VPU3. Even though the changes are made, each of the threads A and B can always access the local storage of the VPU that executes its partner thread by accessing a given area in the segment having a fixed address.

A procedure for address management performed by the VPU runtime environment 401 will now be described with reference to the flowchart shown in FIG. 43. The VPU runtime environment 401 maps in the fixed address on the EA space of each thread an RA space corresponding to the local storage of the VPU that executes its partner thread (step S201). After that, the VPU runtime environment 401 determines whether the VPU that executes the partner thread is changed due to a change in the VPU to which the partner thread is dispatched or a change in the correspondence between the logical and physical VPUs (step S202). If the VPU that executes the partner thread is changed, the VPU runtime environment 401 rewrites the contents of the segment table or page table and changes the local storage mapped in the fixed address on the EA space of each thread in accordance with the VPU that executes the partner thread (step S203).

The example described up to now is directed to a system for accessing a local storage of the VPU that executes the partner thread. The system is suitable for the tightly coupled threads that are always executed simultaneously. However, there is a case where the threads that run in cooperation with each other are not always assigned to the VPUs at once, as in the loosely coupled thread group. In this case, too, the EA space has a segment for mapping the local storage of VPU 12 that executes the partner thread and thus the segment is used as follows to deal with the local storage.

First method: If a segment for mapping the local storage of a VPU corresponding to a partner thread is accessed while the partner thread is not running, a thread is caused to wait until the partner thread starts to run.

Second method: If a segment for mapping the local storage of a VPU corresponding to a partner thread is accessed while the partner thread is not running, a thread becomes aware of it by an exception or an error code.

Figure 45:
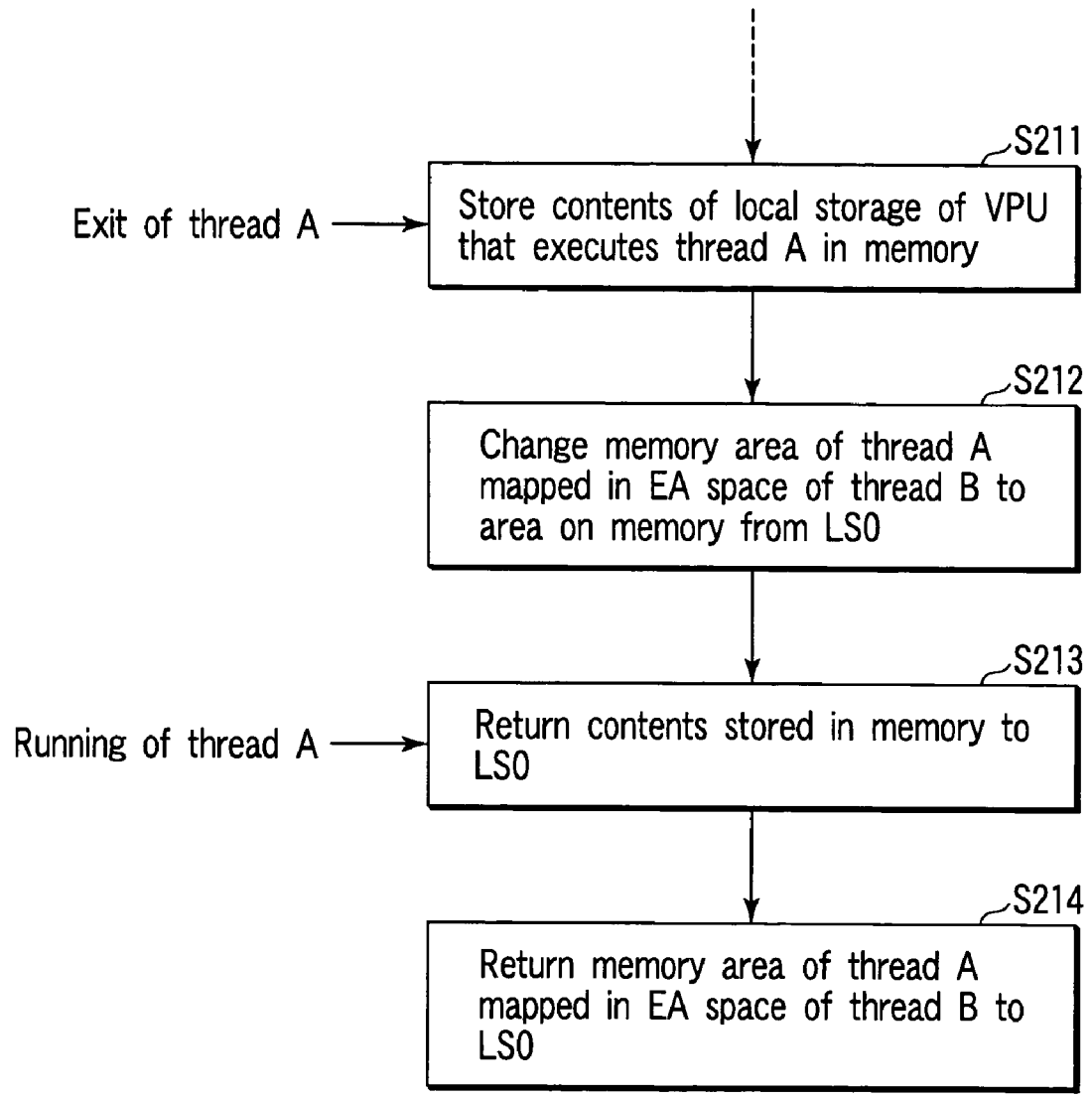
FIG. 45 is a flowchart showing a procedure for the change in mapping between the memory and local storages in the real-time processing system according to the embodiment of the present invention.

Third method: When a thread exits, the contents of the local storage, which are provided when the thread runs finally, are stored in the memory area. The mapping is controlled such that the entries of the page table or segment table, which indicate the local storage corresponding to the thread, indicate the memory area. According to this method, even though the partner thread is not running, a thread can continues to run as if there were a local storage corresponding to the partner thread. A specific example thereof is shown in FIGS. 44 and 45.

(1) Assume that threads A and B are executed by VPUs 0 and 1, respectively and the local storage LS0 of VPU0 that executes the thread A is mapped in the EA space of the thread B.

(2) When the thread A exits, the thread A or VPU runtime environment 401 stores (saves) the contents of local storage LS0 of VPU0 that executes the thread A in a memory area on the memory 14 (step S211).

(3) The VPU runtime environment 401 changes the address space for the local storage of the thread A, which is mapped in the EA space of the thread B, from the LS0 of VPU0 to the memory area on the memory 14 that stores the contents of the LS0 (step S212). Thus, the thread B can continue to run even after the thread A stops running.

(4) When a VPU is allocated to the thread A again, the VPU runtime environment 401 restores the content of the memory area on the memory 14 to the local storage of the VPU that executes the thread A (step S213). If the VPU0 is allocated to the thread A again, the content of the memory area is restored to the local storage LS0 of the VPU0.

(5) The VPU runtime environment 401 changes the address space of the local storage of the thread A, which is mapped in the EA space of the thread B, to the local storage of the VPU that executes the thread A (step S214). If the VPU 0 is allocated to the thread A again, the address space of the local storage of the thread A, which is mapped in the EA space of the thread B, is changed to the local storage LS0 of the VPU 0.

If the VPU 2 is allocated to the thread A, the content of the memory area on the memory 14 is restored to the local storage LS2 of the VPU 2. Then, the address space of the local storage of the thread A, which is mapped in the EA space of the thread B, is changed to the local storage LS2 of the VPU2.

As described above, in the information processing system according to the present embodiment, each of VPUs 1 and 2 includes a local memory 32; therefore, each thread can execute a program by simply accessing the local memory 32 in the VPU, not the shared memory 14. The local memory of a VPU corresponding to a partner thread, which is mapped in the effective address space of each thread is automatically changed in accordance with a VPU that executes the partner thread interacting with the thread. Each thread can efficiently interact with its partner thread without being aware of a processor to which the partner thread is dispatched. Consequently, a plurality of threads can be executed with efficiency in parallel to each other.

The MPU 11 and VPUs 12 provided in the computer system shown in FIG. 1 can be implemented as parallel processors mixed on one chip. In this case, too, the VPU running environment executed by the MPU 11 or the VPU running environment executed by a specific VPU or the like can perform scheduling and address management for the VPUs 12.

If the programs running as the VPU running environment or the programs of the operating system including the VPU running environment are stored in a computer readable storage medium and then introduced and executed in a computer including a plurality of processors each having a local memory, the same advantages as those of the foregoing embodiment of the present invention can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing system comprising:
   a first processor having a first local memory;
   a second processor having a second local memory;
   a third processor having a third local memory;
   a shared memory shared by the first to third processors, the shared memory and the first to third local memories being mapped in a real address space;
   means for mapping one of the second local memory and the third local memory in part of an effective address space of a first thread executed by the first processor, said one of the second local memory and the third local memory being the local memory of a corresponding one of the second processor and the third processor, which executes a second thread interacting with the first thread, the second thread holding thread context including contents of said one of the second local memory and the third local memory, the first thread accessing said one of the second local memory and the third local memory via said part of the effective address space of the first thread to interact with the second thread; and
   means for mapping the other of the second local memory and the third local memory in said part of the effective address space of the first thread instead of said one of the second local memory and the third local memory when a processor that executes the second thread is changed from said one of the second processor and the third processor to the other of the second processor and the third processor, the first thread accessing the other of the second local memory and the third local memory via said part of the effective address space of the first thread to interact with the second thread.

2. The information processing system according to claim 1, further comprising:
  means for storing contents of said one of the second local memory and the third local memory in a memory area on the shared memory when the second thread stops to run; and
  means for mapping the memory area on the shared memory in said part of the effective address space of the first thread instead of said one of the second local memory and the third local memory, the first thread accessing the memory area on the shared memory via said part of the effective address space of the first thread to interact with the second thread.

3. The information processing system according to claim 2, further comprising:
  means for restoring contents of the memory area on the shared memory to said one of the second local memory and the third local memory when the second thread is resumed by said one of the second processor and the third processor; and
  means for mapping said one of the second local memory and the third local memory in said part of the effective address space of the first thread instead of the memory area on the shared memory.

4. The information processing system according to claim 2, further comprising:
  means for restoring contents of the memory area on the shared memory to the other of the second local memory and the third local memory when the second thread is resumed by the other of the second processor and the third processor; and
  means for mapping the other of the second local memory and the third local memory in said part of the effective address space of the first thread instead of the memory area on the shared memory.

5. A method of managing a local memory used for communication between a plurality of threads, the threads being executed by an information processing system including a first processor having a first local memory, a second processor having a second local memory, a third processor having a third local memory, and a shared memory shared by the first to third processors, the shared memory and the first to third local memories being mapped in a real address space, the method comprising:
  mapping one of the second local memory and the third local memory in part of an effective address space of a first thread executed by the first processor, said one of the second local memory and the third local memory being the local memory of a corresponding one of the second processor and the third processor, which executes a second thread interacting with the first thread, the second thread holding thread context including contents of said one of the second local memory and the third local memory, the first thread accessing said one of the second local memory and the third local memory via said part of the effective address space of the first thread to interact with the second thread; and
  mapping the other of the second local memory and the third local memory in said part of the effective address space of the first thread instead of said one of the second local memory and the third local memory when a processor that executes the second thread is changed from said one of the second processor and the third processor to the other of the second processor and the third processor, the first thread accessing the other of the second local memory and the third local memory via said part of the effective address space of the first thread to interact with the second thread.

6. The method according to claim 5, further comprising:
  storing contents of said one of the second local memory and the third local memory in a memory area on the shared memory, when the second thread stops to run; and
  mapping the memory area on the shared memory in said part of the effective address space of the first thread instead of said one of the second local memory and the third local memory, the first thread accessing the memory area on the shared memory via said part of the effective address space of the first thread to interact with the second thread.

7. The method according to claim 6, further comprising:
  restoring contents of the memory area on the shared memory to said one of the second local memory and the third local memory, when the second thread is resumed by said one of the second processor and the third processor; and
  mapping said one of the second local memory and the third local memory in said part of the effective address space of the first thread instead of the memory area on the shared memory.

8. The method according to claim 6, further comprising:
  restoring contents of the memory area on the shared memory to the other of the second local memory and the third local memory, when the second thread is resumed by the other of the second processor and the third processor; and
  mapping the other of the second local memory and the third local memory in said part of the effective address space of the first thread instead of the memory area on the shared memory.

9. A program stored in computer-readable media, which causes a computer to manage a local memory used for communication between a plurality of threads, the computer including a first processor having a first local memory, a second processor having a second local memory, a third processor having a third local memory, and a shared memory shared by the first to third processors, the shared memory and the first to third local memories being mapped in a real address space, the program comprising:
  causing the computer to map one of the second local memory and the third local memory in part of an effective address space of a first thread executed by the first processor, said one of the second local memory and the third local memory being the local memory of a corresponding one of the second processor and the third processor, which executes a second thread interacting with the first thread, the second thread holding thread context including contents of said one of the second local memory and the third local memory, the first thread accessing said one of the second local memory and the third local memory via said part of the effective address space of the first thread to interact with the second thread; and
  causing the computer to map the other of the second local memory and the third local memory in said part of the effective address space of the first thread instead of said one of the second local memory and the third local memory when a processor that executes the second thread is changed from said one of the second processor and the third processor to the other of the second processor and the third processor, the first thread accessing the other of the second local memory and the third local memory via said part of the effective address space of the first thread to interact with the second thread.

10. The program according to claim 9, further comprising:

causing the computer to store contents of said one of the second local memory and the third local memory in a memory area on the shared memory, when the second thread stops to run; and causing the computer to map the memory area on the shared memory in said part of the effective address space of the first thread instead of said one of the second local memory and the third local memory, the first thread accessing the memory area on the shared memory via said part of the effective address space of the first thread to interact with the second thread.

11. The program according to claim 9, further comprising:

causing the computer to restore contents of a memory area on the shared memory to said one of the second local memory and the third local memory, when the second thread is resumed by said one of the second processor and the third processor; and causing the computer to map said one of the second local memory and the third local memory in said part of the effective address space of the first thread instead of the memory area on the shared memory.

12. The program according to claim 9, further comprising:

causing the computer to restore contents of a memory area on the shared memory to the other of the second local memory and the third local memory, when the second thread is resumed by the other of the second processor and the third processor; and causing the computer to map the other of the second local memory and the third local memory in said part of the effective address space of the first thread instead of the memory area on the shared memory.

* * * * *